United States Patent
Lin et al.

(10) Patent No.: US 11,561,364 B2
(45) Date of Patent: Jan. 24, 2023

(54) OPTICAL IMAGING LENS MODULE

(71) Applicant: Genius Electronic Optical (Xiamen) Co., Ltd., Fujian (CN)

(72) Inventors: Chun-Hsiang Lin, Taichung (TW); Wensen Chen, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 82 days.

(21) Appl. No.: 16/869,537

(22) Filed: May 7, 2020

(65) Prior Publication Data

US 2021/0157090 A1 May 27, 2021

(30) Foreign Application Priority Data

Nov. 21, 2019 (CN) .......................... 201911147890.8

(51) Int. Cl.
| | | |
|---|---|---|
| *G02B 7/09* | (2021.01) | |
| *G02B 7/02* | (2021.01) | |
| *G02B 13/02* | (2006.01) | |
| *G02B 13/18* | (2006.01) | |

(52) U.S. Cl.
CPC ................ *G02B 7/09* (2013.01); *G02B 7/021* (2013.01); *G02B 13/02* (2013.01); *G02B 13/18* (2013.01)

(58) Field of Classification Search
CPC .................................. G02B 13/02; G02B 7/09
See application file for complete search history.

(56) References Cited

U.S. PATENT DOCUMENTS

| | | | | |
|---|---|---|---|---|
| 5,880,892 | A * | 3/1999 | Ohtake | G02B 15/1461 359/683 |
| 6,710,932 | B2 * | 3/2004 | Kitaoka | G02B 15/144113 359/686 |
| 2006/0056060 | A1 * | 3/2006 | Ozaki | G02B 7/023 359/704 |
| 2017/0192203 | A1 * | 7/2017 | Chang | G02B 27/0025 |
| 2021/0109321 | A1 * | 4/2021 | Jo | G02B 13/0045 |

FOREIGN PATENT DOCUMENTS

| | | | | |
|---|---|---|---|---|
| KR | 20100080886 A | * | 7/2010 | |
| WO | WO-2013136053 A1 | * | 9/2013 | G03B 5/00 |

* cited by examiner

*Primary Examiner* — Ephrem Z Mebrahtu
(74) *Attorney, Agent, or Firm* — Chen Yoshimura LLP

(57) ABSTRACT

An optical imaging lens module is provided, the optical imaging lens module may include a first lens barrel and a second lens barrel, positioned in an order from an image side to an object side along an optical axis; an optical imaging lens, comprising a first lens element group and a second lens element group, disposed in the first lens barrel and the second lens barrel respectively; an actuating unit, disposed on an external side of the second lens barrel to make the second lens barrel to be a movable barrel, which can move along the optical axis relative to the first lens barrel. The optical imaging lens may satisfy EFL/TTL≥0.850, in which a system focal length is represented by EFL, and a distance from an object-side surface of the lens element having refracting power and closest to the object side to an imaging plane along the optical axis is represented by TTL.

17 Claims, 23 Drawing Sheets

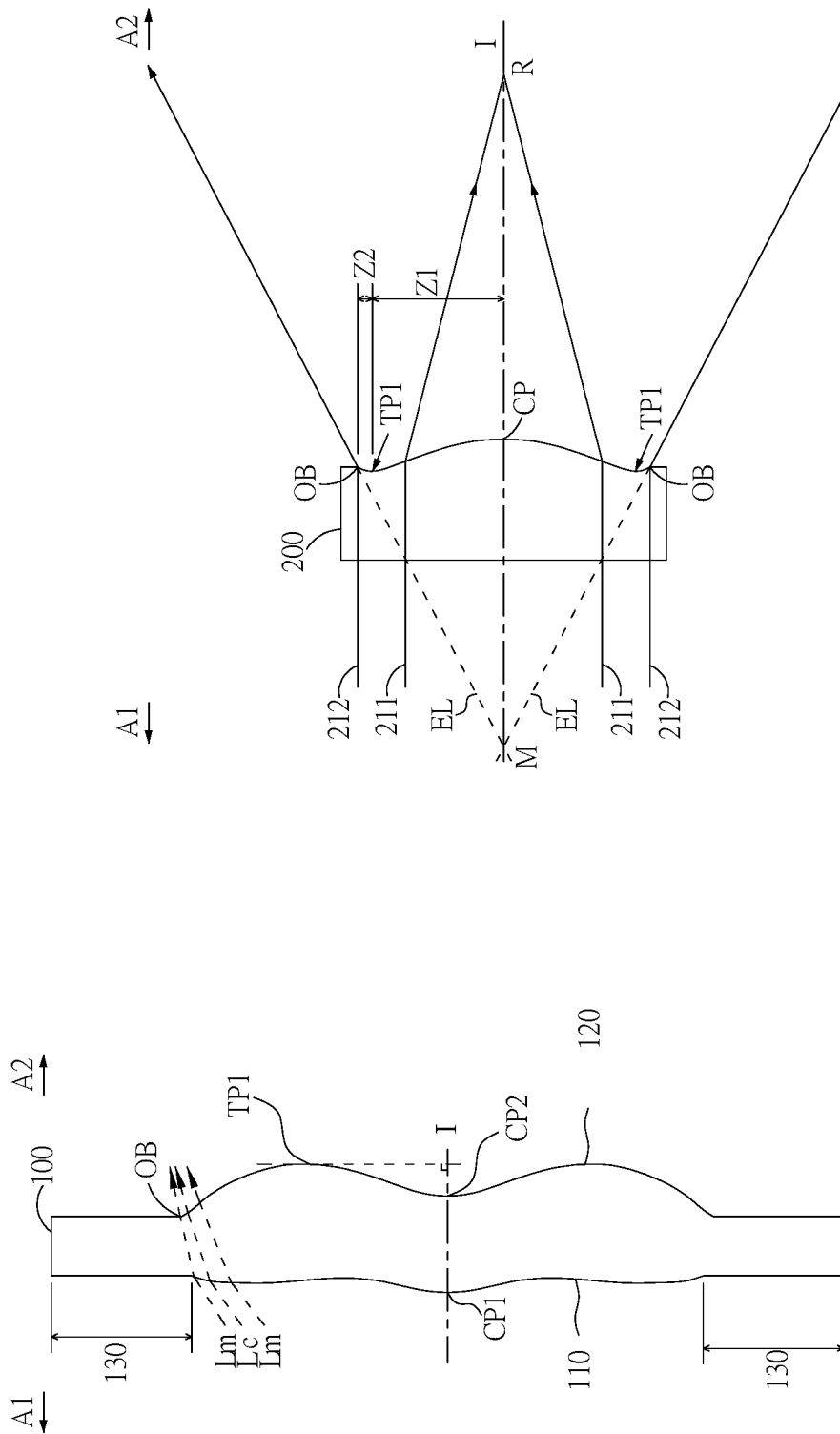

| Embodiment 1 |||||||
|---|---|---|---|---|---|---|
| EFL = 17.715 mm；HFOV = 8.387 dgrees；TTL = 17.141 mm |||||||
| Fno = 3.475；Image Height = 2.557 mm；f35 equivalent focal length= 149.990 mm |||||||
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.852 | | | | |
| L1A1 | 1st lens element | 4.243 | 1.825 | 1.545 | 55.987 | 13.089 | Plastic |
| L1A2 | | 11.912 | 1.714 | | | | |
| L2A1 | 2nd lens element | 280.405 | 0.420 | 1.642 | 22.409 | -10.797 | Plastic |
| L2A2 | | 5.659 | 0.541 | | | | |
| L3A1 | 3rd lens element | 5.095 | 1.764 | 1.545 | 55.987 | 8.878 | Plastic |
| L3A2 | | -113.978 | 0.857 | | | | |
| L4A1 | 4th lens element | -6.438 | 0.656 | 1.545 | 55.987 | -7.629 | Plastic |
| L4A2 | | 19.828 | 0.970 | | | | |
| L5A1 | 5th lens element | 9.379 | 1.930 | 1.642 | 22.409 | 15.281 | Plastic |
| L5A2 | | 30.221 | 4.456 | | | | |
| TFA1 | Filtering unit | INFINITY | 0.210 | 1.517 | 64.167 | | |
| TFA2 | | INFINITY | 1.798 | | | | |
| IMG | Image plane | INFINITY | | | | | |

FIG. 7C

| Embodiment 1 | | | | |
|---|---|---|---|---|
| Aspherical Parameters | | | | |
| Surface # | K | $a_2$ | $a_4$ | $a_6$ |
| L1A1 | -7.433272E+00 | 0.000000E+00 | 5.841568E-04 | -1.668305E-05 |
| L1A2 | 4.129227E+00 | 0.000000E+00 | 1.226344E-03 | -8.768372E-06 |
| L2A1 | 7.621517E+03 | 0.000000E+00 | -3.551093E-05 | -2.574756E-06 |
| L2A2 | 6.547525E+00 | 0.000000E+00 | -1.267815E-04 | -6.586520E-06 |
| L3A1 | -8.308763E-01 | 0.000000E+00 | -2.950984E-05 | -5.018522E-05 |
| L3A2 | -8.000674E-01 | 0.000000E+00 | 7.361440E-04 | -3.288085E-05 |
| L4A1 | -2.260177E+02 | 0.000000E+00 | -4.676707E-04 | -2.738904E-05 |
| L4A2 | -2.595982E+01 | 0.000000E+00 | 1.261360E-03 | -1.889442E-07 |
| L5A1 | -1.182629E+01 | 0.000000E+00 | -1.514091E-04 | 9.297044E-05 |
| L5A2 | -6.720014E+00 | 0.000000E+00 | -1.556625E-03 | -7.949013E-06 |
| Surface # | $a_8$ | $a_{10}$ | $a_{12}$ | |
| L1A1 | -5.504056E-06 | -5.519146E-07 | -4.241569E-09 | |
| L1A2 | -2.430022E-06 | -8.838602E-07 | -5.615458E-08 | |
| L2A1 | 9.791526E-07 | -3.880889E-07 | -2.588578E-08 | |
| L2A2 | -1.531988E-06 | 1.008060E-07 | 2.844348E-08 | |
| L3A1 | -3.484021E-06 | 6.497182E-07 | 0.000000E+00 | |
| L3A2 | 8.723861E-07 | 2.333278E-09 | 0.000000E+00 | |
| L4A1 | -6.729305E-07 | -6.841502E-08 | -5.158040E-09 | |
| L4A2 | -2.980759E-06 | -8.625848E-08 | -2.802812E-08 | |
| L5A1 | 5.692335E-07 | -3.857113E-07 | -2.133725E-08 | |
| L5A2 | 3.635113E-06 | 3.478507E-07 | -2.461166E-08 | |

FIG. 7D

| Embodiment1 | | | | | | |
|---|---|---|---|---|---|---|
| Temperature (°C) | -20 | 20 | 60 | -20 | 20 | 60 |
| Object distance (mm) | INFINITY | INFINITY | INFINITY | 1200 | 1200 | 1200 |
| G34 (mm) | 0.797 | 0.857 | 0.911 | 0.901 | 0.963 | 1.020 |
| EFL (mm) | 17.590 | 17.715 | 17.833 | 17.418 | 17.541 | 17.655 |

FIG. 7E

| Embodiment 3 | | | | | | | |
|---|---|---|---|---|---|---|---|
| EFL = 31.199 mm ; HFOV = 4.124 dgrees ; TTL = 29.098 mm | | | | | | | |
| Fno = 3.480 ; Image Height = 2.250 mm ; f35 equivalent focal length= 300.201 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -1.614 | | | | |
| L1A1 | 1st lens element | 6.998 | 2.954 | 1.545 | 55.987 | 13.089 | Plastic |
| L1A2 | | 34.588 | 1.751 | | | | |
| L2A1 | 2nd lens element | 123.398 | 0.332 | 1.642 | 22.409 | -10.797 | Plastic |
| L2A2 | | 8.058 | 0.974 | | | | |
| L3A1 | 3rd lens element | 7.695 | 2.918 | 1.545 | 55.987 | 8.878 | Plastic |
| L3A2 | | -739.340 | 0.252 | | | | |
| L4A1 | 4th lens element | -8.493 | 0.826 | 1.545 | 55.987 | -7.629 | Plastic |
| L4A2 | | 18.785 | 0.796 | | | | |
| L5A1 | 5th lens element | 10.476 | 3.050 | 1.642 | 22.409 | 15.281 | Plastic |
| L5A2 | | 30.905 | 10.102 | | | | |
| TFA1 | Filtering unit | INFINITY | 0.210 | 1.517 | 64.167 | | |
| TFA2 | | INFINITY | 4.933 | | | | |
| IMG | Image plane | INFINITY | | | | | |

FIG. 10C

| Embodiment 3 ||||
|---|---|---|---|---|
| Aspherical Parameters |||||
| Surface # | K | $a_2$ | $a_4$ | $a_6$ |
| L1A1 | 0.000000E+00 | 0.000000E+00 | -4.755229E-05 | 3.227167E-06 |
| L1A2 | 0.000000E+00 | 0.000000E+00 | 6.299210E-05 | 3.829202E-05 |
| L2A1 | 0.000000E+00 | 0.000000E+00 | -7.148127E-04 | -1.814942E-05 |
| L2A2 | 0.000000E+00 | 0.000000E+00 | -1.128890E-03 | -2.007113E-04 |
| L3A1 | 0.000000E+00 | 0.000000E+00 | -1.992084E-04 | -1.480723E-04 |
| L3A2 | 0.000000E+00 | 0.000000E+00 | 2.938513E-04 | 1.044762E-04 |
| L4A1 | 0.000000E+00 | 0.000000E+00 | 7.268221E-03 | -3.046612E-04 |
| L4A2 | 0.000000E+00 | 0.000000E+00 | 6.298555E-03 | 5.971782E-05 |
| L5A1 | 0.000000E+00 | 0.000000E+00 | -2.055423E-03 | 1.918460E-04 |
| L5A2 | 0.000000E+00 | 0.000000E+00 | -1.423556E-03 | 2.751163E-05 |
| Surface # | $a_8$ | $a_{10}$ | $a_{12}$ | |
| L1A1 | 3.033792E-07 | -1.942728E-08 | 1.077253E-09 | |
| L1A2 | -2.352540E-06 | 1.455166E-07 | -1.885428E-09 | |
| L2A1 | 2.211606E-05 | -1.707406E-06 | 3.689459E-08 | |
| L2A2 | 5.132347E-05 | -3.248731E-06 | 5.252904E-08 | |
| L3A1 | 2.267953E-05 | -9.083662E-07 | -2.151481E-08 | |
| L3A2 | -1.861861E-05 | 8.547605E-07 | -3.269516E-08 | |
| L4A1 | -5.326354E-05 | 8.697814E-06 | -3.429740E-07 | |
| L4A2 | -1.044174E-04 | 1.030805E-05 | -4.303690E-07 | |
| L5A1 | -3.367673E-05 | 4.287430E-07 | -1.687166E-07 | |
| L5A2 | -1.155897E-05 | 1.180829E-07 | 2.108535E-08 | |

FIG. 10D

| Embodiment 3 | | | | | | |
|---|---|---|---|---|---|---|
| Temperature (°C) | -20 | 20 | 60 | -20 | 20 | 60 |
| Object distance (mm) | INFINITY | INFINITY | INFINITY | 1200 | 1200 | 1200 |
| G12 (mm) | 1.684 | 1.751 | 1.816 | 1.869 | 1.941 | 2.007 |
| EFL (mm) | 30.993 | 31.199 | 31.382 | 30.401 | 30.593 | 30.779 |

FIG. 10E

| Embodiment 4 | | | | | | | |
|---|---|---|---|---|---|---|---|
| EFL = 27.261 mm ; HFOV = 5.583 dgrsse ; TTL = 30.933 mm | | | | | | | |
| Fno = 3.480 ; Image Height = 2.500 mm ; f35 equivalent focal length= 236.121 mm | | | | | | | |
| Surface # | | Radius (mm) | Thickness /air gap (mm) | Refractive index | Abbe number | Focal length (mm) | Material |
| OBJ | Object | INFINITY | INFINITY | | | | |
| STO | Aperture stop | INFINITY | -0.746 | | | | |
| L1A1 | 1st lens element | 10.055 | 3.229 | 1.545 | 55.987 | 20.241 | Plastic |
| L1A2 | | 98.313 | 1.509 | | | | |
| L2A1 | 2nd lens element | -118.308 | 0.837 | 1.642 | 22.409 | -47.653 | Plastic |
| L2A2 | | 41.842 | 0.941 | | | | |
| L3A1 | 3rd lens element | 29.995 | 0.458 | 1.642 | 22.409 | -61.856 | Plastic |
| L3A2 | | 17.046 | 0.290 | | | | |
| L4A1 | 4th lens element | 57.178 | 2.745 | 1.545 | 55.987 | 77.340 | Plastic |
| L4A2 | | -159.063 | 9.257 | | | | |
| L5A1 | 5th lens element | -165.466 | 1.521 | 1.545 | 55.987 | 21.338 | Plastic |
| L5A2 | | -10.925 | 2.421 | | | | |
| L6A1 | 6th lens element | -37.598 | 2.050 | 1.531 | 55.745 | -19.448 | Plastic |
| L6A2 | | 14.596 | 3.048 | | | | |
| TFA1 | Filtering unit | INFINITY | 0.210 | 1.517 | 64.167 | | |
| TFA2 | | INFINITY | 2.417 | | | | |
| IMG | Image plane | INFINITY | | | | | |

FIG. 11C

| Embodiment 4 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -5.336331E-05 | 1.370964E-06 |
| L1A2 | 0.000000E+00 | 0.000000E+00 | -1.457550E-04 | 9.775506E-06 |
| L2A1 | 0.000000E+00 | 0.000000E+00 | -1.590138E-04 | 1.537032E-05 |
| L2A2 | 0.000000E+00 | 0.000000E+00 | -6.255679E-05 | 1.796818E-05 |
| L3A1 | -7.327845E+00 | 0.000000E+00 | -6.177764E-04 | 1.954406E-05 |
| L3A2 | -1.009955E+01 | 0.000000E+00 | -4.707584E-04 | 1.437322E-05 |
| L4A1 | 0.000000E+00 | 0.000000E+00 | -5.045709E-04 | 1.296612E-05 |
| L4A2 | 0.000000E+00 | 0.000000E+00 | -6.278551E-04 | 5.643694E-06 |
| L5A1 | 0.000000E+00 | 0.000000E+00 | -5.751700E-04 | 9.232101E-06 |
| L5A2 | -4.294061E-01 | 0.000000E+00 | 1.574590E-03 | 3.631514E-05 |
| L6A1 | -1.458382E+01 | 0.000000E+00 | 7.959272E-04 | -2.834375E-05 |
| L6A2 | -1.161806E+01 | 0.000000E+00 | -3.536842E-03 | 3.944913E-05 |
| Surface # | $a_8$ | $a_{10}$ | $a_{12}$ | $a_{14}$ |
| L1A1 | -6.321793E-08 | 6.147332E-09 | -1.358200E-11 | 9.599000E-12 |
| L1A2 | -1.375961E-07 | 1.272781E-08 | 3.928970E-10 | 4.978000E-12 |
| L2A1 | -3.048210E-07 | 1.253230E-08 | 2.833300E-10 | 1.248000E-11 |
| L2A2 | -8.310901E-07 | 1.847228E-08 | -1.091820E-09 | 6.082400E-11 |
| L3A1 | -9.032539E-07 | 2.448361E-08 | -4.820660E-10 | -1.908510E-10 |
| L3A2 | -7.936989E-07 | -2.111532E-08 | -2.252907E-09 | -1.833590E-10 |
| L4A1 | -2.475772E-07 | -3.031026E-08 | -4.046875E-09 | -1.823520E-10 |
| L4A2 | 4.065080E-07 | 2.882371E-08 | -2.374536E-09 | -3.901670E-10 |
| L5A1 | 3.110810E-06 | -4.435083E-09 | -1.387955E-08 | -1.342748E-09 |
| L5A2 | -4.737444E-07 | 7.979036E-08 | 6.409329E-09 | -1.987110E-10 |
| L6A1 | -8.598828E-07 | 2.863178E-08 | 1.113522E-08 | 1.197567E-09 |
| L6A2 | 1.343435E-06 | -1.066553E-07 | -3.202665E-09 | 7.401460E-10 |
| Surface # | $a_{16}$ | $a_{18}$ | $a_{20}$ | |
| L1A1 | -8.620000E-13 | | | |
| L1A2 | -4.302000E-12 | | | |
| L2A1 | -2.575000E-12 | | | |
| L2A2 | 8.509000E-12 | | | |
| L3A1 | -1.090300E-11 | | | |
| L3A2 | -7.612000E-12 | | | |
| L4A1 | -7.600000E-13 | 2.279000E-12 | 0.000000E+00 | |
| L4A2 | -1.632600E-11 | 3.163000E-12 | 0.000000E+00 | |
| L5A1 | -5.659000E-11 | 4.740000E-13 | 3.210000E-13 | |
| L5A2 | -7.544500E-11 | -5.695000E-12 | 4.820000E-13 | |
| L6A1 | 1.565500E-10 | 6.870000E-12 | -1.248000E-12 | |
| L6A2 | 1.305330E-10 | 9.111000E-12 | -4.480000E-13 | |

FIG. 11D

| Embodiment 4 | | | | | | |
|---|---|---|---|---|---|---|
| Temperature (°C) | -20 | 20 | 60 | -20 | 20 | 60 |
| Object distance (mm) | INFINITY | INFINITY | INFINITY | 1200 | 1200 | 1200 |
| G12 (mm) | 1.393 | 1.509 | 1.618 | 1.709 | 1.831 | 1.946 |
| EFL (mm) | 27.052 | 27.261 | 27.462 | 26.779 | 26.984 | 27.181 |

FIG. 11E

| Embodiment | 1st | 3rd |
|---|---|---|
| f35 equivalent focal length | 149.990 | 300.201 |
| T1 | 1.825 | 2.954 |
| G12 | 1.714 | 1.751 |
| T2 | 0.420 | 0.332 |
| G23 | 0.541 | 0.974 |
| T3 | 1.764 | 2.918 |
| G34 | 0.857 | 0.252 |
| T4 | 0.656 | 0.826 |
| G45 | 0.970 | 0.796 |
| T5 | 1.930 | 3.050 |
| G5F | 4.456 | 10.102 |
| TTF | 0.210 | 0.210 |
| GFP | 1.798 | 4.933 |
| BFL | 6.464 | 15.245 |
| EFL | 17.715 | 31.199 |
| TTL | 17.141 | 29.098 |
| TL | 10.676 | 13.854 |
| ALT | 6.594 | 10.080 |
| AAG | 4.082 | 3.773 |
| D | 0.163 | 0.256 |
| HFOV | 8.387 | 4.124 |
| EFL/TTL | 1.034 | 1.072 |
| EFL/(TTL*D) | 6.341 | 4.188 |
| ALT/AAG | 1.615 | 2.671 |

FIG. 14

| Embodiment | 4th |
|---|---|
| f35 equivalent focal length | 236.121 |
| T1 | 3.229 |
| G12 | 1.509 |
| T2 | 0.837 |
| G23 | 0.941 |
| T3 | 0.458 |
| G34 | 0.290 |
| T4 | 2.745 |
| G45 | 9.257 |
| T5 | 1.521 |
| G56 | 2.421 |
| T6 | 2.050 |
| G6F | 3.048 |
| TTF | 0.210 |
| GFP | 2.417 |
| BFL | 10.146 |
| EFL | 27.261 |
| TTL | 30.933 |
| TL | 20.786 |
| ALT | 8.789 |
| AAG | 11.997 |
| D | 0.437 |
| HFOV | 5.583 |
| EFL/TTL | 0.881 |
| EFL/(TTL*D) | 2.017 |
| ALT/AAG | 0.752 |

FIG. 15

OPTICAL IMAGING LENS MODULE

CROSS-REFERENCE TO RELATED APPLICATIONS

This application claims priority to P.R.C. Patent Application No. 201911147890.8 titled "Optical Imaging Lens Module," filed on Nov. 21, 2019, with the State Intellectual Property Office of the People's Republic of China (SIPO).

TECHNICAL FIELD

The present disclosure relates to an optical imaging lens module, and particularly, to an optical imaging lens module for capturing image and video.

BACKGROUND

The current optical imaging lens applied for portable electronic products uses an actuator to adjust the position of the entire lens to achieve the purpose of autofocus. Due to the increasing requirements of the optical zoom of portable products in the current market, longer focal lengths are also required for telephoto lenses.

The more common dual-lens portable electronic products are equipped with a wide-angle lens with f35 equivalent focal length of 26 mm and a telephoto lens with f35 equivalent focal length of 52 mm, such that the function of 2× optical zoom can be achieved. The actuator in the current market has a maximum travel distance of about 0.450 mm. When the telephoto lens with f35 equivalent focal length is 5 times the optical zoom magnification, and is adjusted during from focusing at an infinite object distance to focusing at a closer distance, e.g., 1.200 m, a corresponding change distance between the entire lens and the image plane adjusted by the actuator is close to the maximum travel distance that it can move. In other words, to meet a larger optical magnification, telephoto lenses with longer focal lengths currently required by the market can no longer utilize the design of conventional optical imaging lenses with existing actuators to adjust the distance between the entire lens and the image plane for focusing. In addition, changes in the temperature difference of the environment will make the actuator need to move a longer travel distance for focusing. Therefore, in the application of the telephoto lens, the change of the object distance and the influence of the temperature difference cannot complete the focusing function through the design of the existing optical imaging lens in conjunction with the actuator.

Accordingly, it is necessary to provide an optical imaging lens with a telephoto function, which can resolve the problem of the maximum travel distance of the actuator of the current optical imaging lens being insufficient to adjust the corresponding change distance between the entire lens and the image plane while focusing from an infinite object distance to closer distance, can maintain good imaging quality at different temperatures, and has a small optical imaging lens size

SUMMARY

In light of the abovementioned problems, the present disclosure provides an optical imaging lens module applicable to travel distance provided by actuators currently on the market at different temperatures.

The present disclosure provides an optical imaging lens module for capturing image and video such as the optical imaging lens of cell phones, cameras, tablets and personal digital assistants.

In the specification, parameters used herein may include:

| Parameter | Definition |
|---|---|
| Object distance | A distance from an object to the object-side surface of the lens element closest to the object side along the optical axis |
| T1 | A thickness of the first lens element along the optical axis |
| G12 | A distance from the image-side surface of the first lens element to the object-side surface of the second lens element along the optical axis |
| T2 | A thickness of the second lens element along the optical axis |
| G23 | A distance from the image-side surface of the second lens element to the object-side surface of the third lens element along the optical axis |
| T3 | A thickness of the third lens element along the optical axis |
| G34 | A distance from the image-side surface of the third lens element to the object-side surface of the fourth lens element along the optical axis |
| T4 | A thickness of the fourth lens element along the optical axis |
| G45 | A distance from the image-side surface of the fourth lens element to the object-side surface of the fifth lens element along the optical axis |
| T5 | A thickness of the fifth lens element along the optical axis |
| G5F | A distance from the image-side surface of the fifth lens element to the object-side surface of the filtering unit along the optical axis |
| G56 | A distance from the image-side surface of the fifth lens element to the object-side surface of the sixth lens element along the optical axis |
| T6 | A thickness of the sixth lens element along the optical axis |
| G6F | A distance from the image-side surface of the sixth lens element to the object-side surface of the filtering unit along the optical axis |
| TTF | A thickness of the filtering unit along the optical axis |
| GFP | A distance from the image-side surface of the filtering unit to the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| n1 | A refractive index of the first lens element |
| n2 | A refractive index of the second lens element |
| n3 | A refractive index of the third lens element |

| Parameter | Definition |
|---|---|
| n4 | A refractive index of the fourth lens element |
| n5 | A refractive index of the fifth lens element |
| n6 | A refractive index of the sixth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| HFOV | A half field of view of the optical imaging lens |
| Fno | A F-number of the optical imaging lens |
| EFL | A system focal length of the optical imaging lens, i.e. a system focal length of the optical imaging lens at 20 degrees Celsius and focusing at an infinite object distance |
| TTL | A distance from the object-side surface of the lens element having refracting power and closest to the object side to the image plane along the optical axis, i.e., a system length of the optical imaging lens |
| ALT | A sum of the thicknesses of the lens elements having refracting power along the optical axis |
| AAG | A sum of all air gaps between any two adjacent lens elements having refracting power along the optical axis |
| BFL | A distance from the image-side surface of the lens element having refracting power and closest to the image side to the image plane along the optical axis |
| TL | A distance from the object-side surface of the lens element having refracting power and closest to the object side to the image-side surface of the lens element having refracting power and closest to the image side along the optical axis |
| ImgH | An image height of the optical imaging lens |
| D | A moving distance of the movable barrel adjusted during from the optical imaging lens at 20 degrees Celsius and focusing at an infinite object distance to the optical imaging lens at 60 degrees Celsius and focusing at an object distance of 1.200 m |

According to an embodiment of the optical imaging lens module of the present disclosure, an optical imaging lens module may comprise a first lens barrel and a second lens barrel, positioned in an order from an image side to an object side along an optical axis; an optical imaging lens, comprising a first lens element group and a second lens element group, disposed in the first lens barrel and the second lens barrel respectively, in which each of lens elements of the first lens element group and the second lens element group may have an object-side surface facing toward the object side and allowing imaging rays to pass through as well as an image-side surface facing toward the image side and allowing the imaging rays to pass through; and an actuating unit, disposed on an external side of the second lens barrel to make the second lens barrel to be a movable barrel, in which the movable barrel can move along the optical axis relative to the first lens barrel. The optical imaging lens may satisfy Inequality (1): EFL/TTL≥0.850. Accordingly, the optical imaging lens module of this embodiment can effectively reduce the travel distance of the current actuating unit to resolve the problem of the maximum travel distance of the current actuating unit being insufficient to adjust the corresponding increased distance between the optical imaging lens and the image plane while focusing from an infinite object distance to closer distance, such that the optical imaging lens module may have advantages of reducing using power and reducing size, in which a further restriction for Inequality (1) defined below may constitute better configuration: 0.850≤EFL/TTL≤1.200.

According to another embodiment of the optical imaging lens module of the present disclosure, an optical imaging lens module may comprise a first lens barrel and a second lens barrel, positioned in an order from an image side to an object side along an optical axis; an optical imaging lens, comprising a first lens element group and a second lens element group, disposed in the first lens barrel and the second lens barrel respectively, in which each of lens elements of the first lens element group and the second lens element group may have an object-side surface facing toward the object side and allowing imaging rays to pass through as well as an image-side surface facing toward the image side and allowing the imaging rays to pass through; and an actuating unit, disposed on an external side of the second lens barrel to make the second lens barrel to be a movable barrel, in which the movable barrel can move along the optical axis relative to the first lens barrel. The optical imaging lens may satisfy inequality (2): 2.000≤EFL/(TTL*D)≤10.000. The optical imaging lens module of this embodiment can effectively resolve the problem of the ravel distance of the current actuating unit being insufficient to adjust the corresponding increased distance between the optical imaging lens and the image plane while focusing from an infinite object distance to closer distance for telephoto application.

According to another embodiment of the optical imaging lens module of the present disclosure, an optical imaging lens module may comprise a first lens barrel and a second lens barrel, positioned in an order from an image side to an object side along an optical axis; an optical imaging lens, comprising a first lens element group and a second lens element group, disposed in the first lens barrel and the second lens barrel respectively, in which each of lens elements of the first lens element group and the second lens element group may have an object-side surface facing toward the object side and allowing imaging rays to pass through as well as an image-side surface facing toward the image side and allowing the imaging rays to pass through; and an actuating unit, disposed on an external side of the first lens barrel to make the first lens barrel to be a movable barrel, in which the movable barrel can move along the optical axis relative to the second lens barrel. The optical imaging lens may satisfy inequality (1): EFL/TTL≥0.850. Accordingly, the optical imaging lens module of this embodiment can effectively reduce the travel distance of the current actuating unit to resolve the problem of the travel distance of the current actuating unit being insufficient to adjust the corresponding increased distance between the optical imaging lens and the image plane while focusing from an infinite object distance to closer distance, such that the optical imaging lens module may have advantages of reducing using power and reducing size, in which a further restriction for Inequality (1) defined below may constitute better configuration: 0.850≤EFL/TTL≤1.200.

In abovementioned three exemplary embodiments, the second lens element group of the optical imaging lens may be composed of three lens elements, which may provide better assembly stability.

In abovementioned three exemplary embodiments, the second lens element group of the optical imaging lens may be composed of one lens element, which may provide better effect of reducing the travel distance of the actuating unit.

In abovementioned three exemplary embodiments, an end of the first lens barrel facing toward the object side may have a first limit part, an end of the second lens barrel facing toward the image side may have a fourth limit part, and the first limit part can slide along the optical axis relative to the fourth limit part, i.e., at least a portion of the first lens barrel may overlap the second lens barrel. Accordingly, it can effectively improve the problem of eccentric assembly, and when the actuating unit moves the first lens barrel or the second lens barrel, it can reduce the degree to which the imaging quality is affected by the shaking of the entire optical mechanism.

Further, when an outside diameter of the first limit part is smaller than an inside diameter of the fourth limit part, and an external side of the first limit part or an inner side of the fourth limit part has a bump unit, it can reduce the resistance of movement of the actuating unit, and the design of the bump unit on the external side of the first limit part makes it easier to mold and release.

According to another embodiment of the optical imaging lens module of the present disclosure, an optical imaging lens module may comprise a first lens barrel, a second lens barrel, and a third lens barrel, positioned in an order from an image side to an object side along an optical axis; an optical imaging lens, comprising a first lens element group, a second lens element group, and a third lens element group disposed in the first lens barrel, the second lens barrel, and the third lens barrel respectively, in which each of lens elements of the first lens element group, the second lens element group, and the third lens element group may have an object-side surface facing toward the object side and allowing imaging rays to pass through as well as an image-side surface facing toward the image side and allowing the imaging rays to pass through; and an actuating unit, disposed on an external side of the second lens barrel to make the second lens barrel to be a movable barrel, in which the movable barrel can move along the optical axis relative to the first lens barrel and the third lens barrel; wherein an end of the second lens barrel facing toward the object side may have a second limit part, an end of the third lens barrel facing toward the image side may have a third limit part, and the second limit part can slide along the optical axis relative to the third limit part, i.e., at least a portion of the second lens barrel may overlap the third lens barrel. Accordingly, the optical imaging lens module of this embodiment can effectively reduce the travel distance of the current actuating unit to resolve the problem of the travel distance of the current actuating unit being insufficient to adjust the corresponding increased distance between the optical imaging lens and the image plane while focusing from an infinite object distance to closer distance, which may provide better assembly stability for an optical mechanism.

In abovementioned exemplary embodiment with three lens barrels, besides the second limit part can slide along the optical axis relative to the third limit part, an end of the first lens barrel facing toward the object side may have a first limit part, an end of the second lens barrel facing toward the image side may have a fourth limit part, and the fourth limit part can slide along the optical axis relative to the first limit part, i.e., the two opposite ends of the second lens barrel may overlap the first lens barrel and the third lens barrel respectively, such that it can effectively increase the stability of the actuating unit when moving and can effectively improve the problem of eccentric assembly.

Further, when an outside diameter of the third limit part is smaller than an inside diameter of the second limit part, and an external side of the third limit part has a bump unit, it can reduce the resistance of movement of the actuating unit.

In any one of the abovementioned exemplary embodiments, the problem that the optical imaging lens module may cause a shift in focal length at different temperatures has been considered. Therefore, by conforming to the design of any one of the abovementioned exemplary embodiments described above, it is possible to maintain good imaging quality at an ambient temperature of −20 to 60° C.

In any one of the abovementioned exemplary embodiments, the optical imaging lens may further satisfy inequality (3): HFOV≤9.000∘. Further restriction for Inequality (3) defined below may increase the telephoto ability: 5.000∘≤HFOV≤9.000∘.

In any one of the abovementioned exemplary embodiments, to maintain appropriate values of the thickness and the gap for each lens element for reducing the system length of the optical imaging lens effectively. For example, further restriction for Inequality (4), ALT/AAG≤2.700, defined below may constitute better configuration: 0.700≤ALT/AAG≤2.700.

In any one of the abovementioned exemplary embodiments, to maintain good imaging quality, the number of lens elements of the optical imaging lens having refracting power may be at least five, for example, the number of lens elements of the optical imaging lens having refracting power being six constitute better configuration.

The exemplary limited inequalities listed above can also be combined in any number of different amounts and applied to the embodiments of the present invention, and are not limited to this. In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated into the example embodiments if no inconsistency occurs.

Through controlling the convex or concave shape of the surfaces and at least one inequality, the optical imaging lens in the example embodiments may maintain good imaging quality, and the system length of the optical imaging lens may be reduced, and the aperture may be enlarged.

BRIEF DESCRIPTION OF THE DRAWINGS

Exemplary embodiments will be more readily understood from the following detailed description when read in conjunction with the appended drawings, in which:

FIG. 1 depicts a cross-sectional view of one single lens element according to one embodiment of the present disclosure;

FIG. 2 depicts a schematic view of a relation between a surface shape and an optical focus of a lens element;

FIG. 7C depicts a table of optical data for each lens element of an optical imaging lens according to the first embodiment of the present disclosure;

FIG. 7D depicts a table of aspherical data of the optical imaging lens according to the first embodiment of the present disclosure;

FIG. 7E depicts a table of data of the distance between the image-side surface of the third lens element and the object-side surface of the fourth lens element of the optical imaging lens according to the first embodiment of the present disclosure when the object distances are infinity and 1200 mm at different temperatures (−20° C., 20° C., and 60° C.);

FIG. 10C depicts a table of optical data for each lens element of an optical imaging lens according to the third embodiment of the present disclosure;

FIG. 10D depicts a table of aspherical data of the optical imaging lens according to the third embodiment of the present disclosure;

FIG. 10E depicts a table of data of the distance between the image-side surface of the first lens element and the object-side surface of the second lens element of the optical imaging lens according to the third embodiment of the present disclosure when the object distances are infinity and 1200 mm at different temperatures (−20° C., 20° C., and 60° C.);

FIG. 11C depicts a table of optical data for each lens element of an optical imaging lens according to the fourth embodiment of the present disclosure;

FIG. 11D depicts a table of aspherical data of the optical imaging lens according to the fourth embodiment of the present disclosure;

FIG. 11E depicts a table of data of the distance between the image-side surface of the first lens element and the object-side surface of the second lens element of the optical imaging lens according to the fourth embodiment of the present disclosure when the object distances are infinity and 1200 mm at different temperatures (−20° C., 20° C., and 60° C.);

FIG. 14 is a table for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/(TTL*D), and ALT/AAG as determined in the first and third embodiments; and FIG. 15 is a table for the values of f35 equivalent focal length, T1, G12, T2, G23, T3, G34, T4, G45, T5, G56, T6, G6F, TTF, GFP, BFL, EFL, TTL, TL, ALT, AAG, D, HFOV, EFL/TTL, EFL/(TTL*D), and ALT/AAG as determined in the fourth embodiment.

DETAILED DESCRIPTION

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
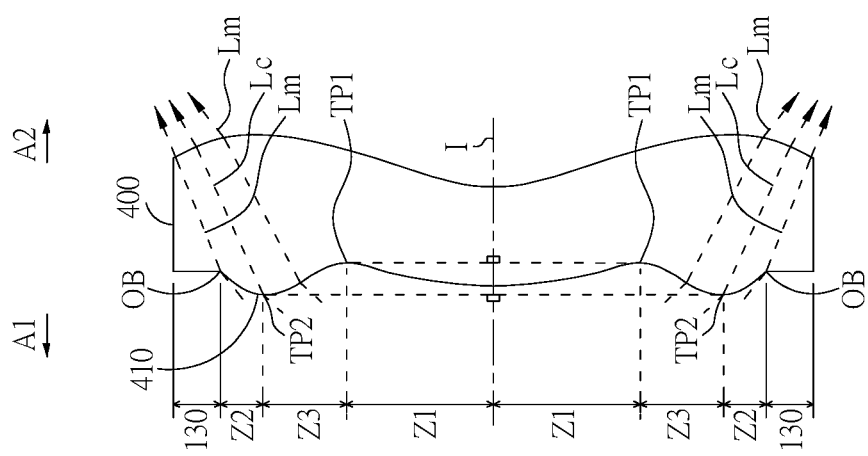
FIG. 4 depicts a schematic view of a second example of a surface shape and an effective radius of a lens element.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
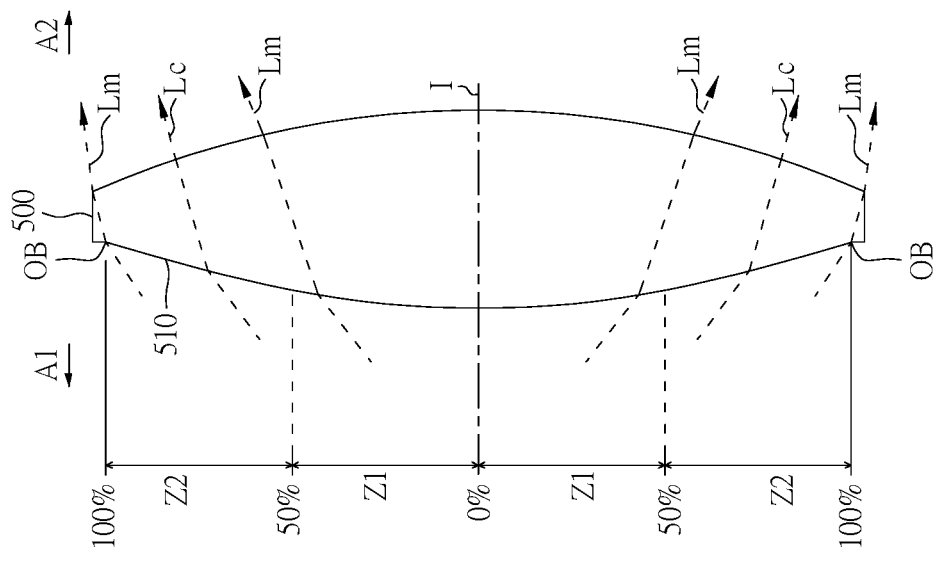
FIG. 5 depicts a schematic view of a third example of a surface shape and an effective radius of a lens element.
Figure 3:
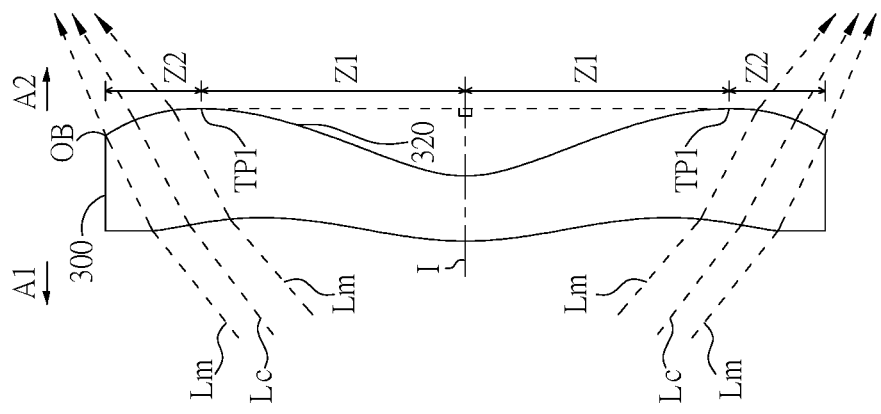
FIG. 3 depicts a schematic view of a first example of a surface shape and an effective radius of a lens element.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

The range of values within the maximum and minimum values derived from the combined ratios of the optical parameters can be implemented according to the following embodiments.

Figure 6B:
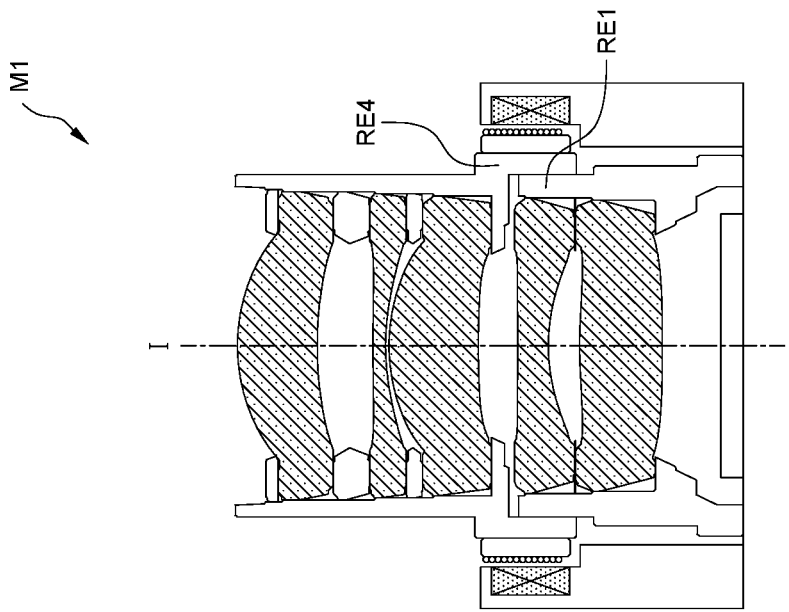
FIG. 6B depicts a cross-sectional view of the optical imaging lens module according to the first embodiment of the present disclosure.
Figure 6A:
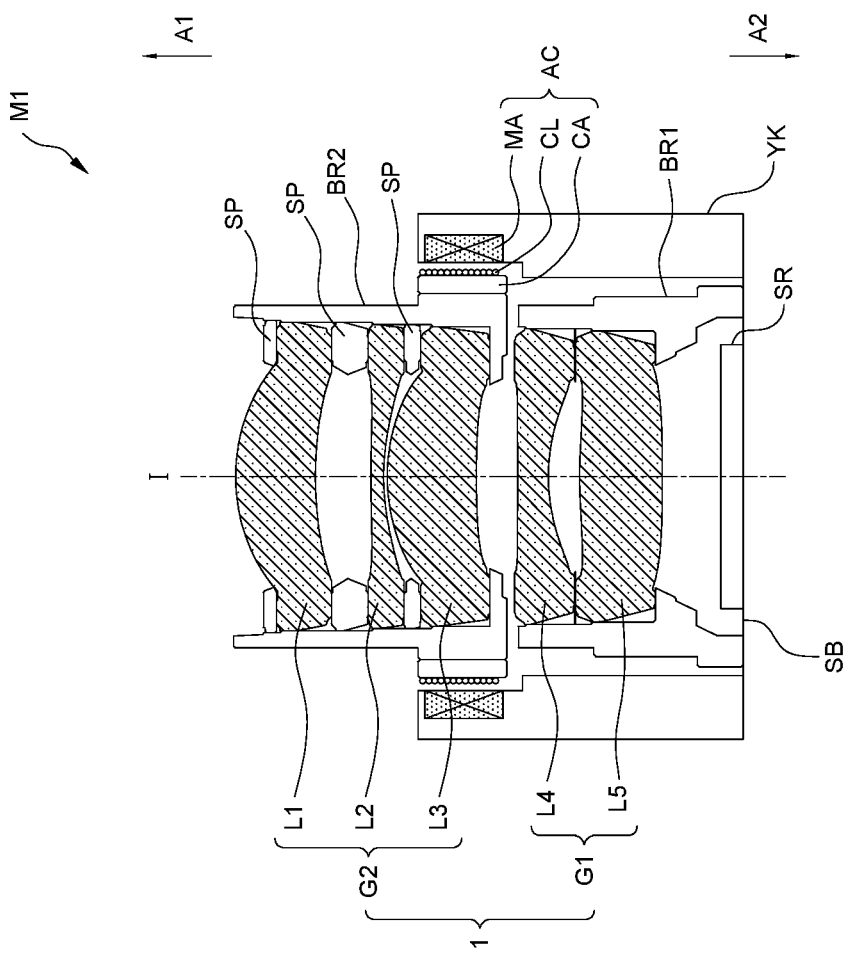
FIG. 6A depicts a cross-sectional view of the optical imaging lens module according to the first embodiment of the present disclosure.

Reference is now made to FIGS. 6A and 6B. FIGS. 6A and 6B illustrate a cross-sectional view of the optical imaging lens module M1 according to the first embodiment of the present disclosure.

As shown in FIG. 6A, the optical imaging lens module M1 of the present embodiment may comprise a substrate SB, a first lens barrel BR1, a second lens barrel BR2, an optical imaging lens 1, an imaging sensor SR, an actuating unit AC, and a fixed part YK.

The first lens barrel BR1 and the second lens barrel BR2 may be positioned in an order from the image side A2 to an object side A1 along an optical axis. The imaging sensor SR may be disposed on the substrate SB, the first lens barrel BR1 may be disposed on the substrate SB and surround the imaging sensor SR, such that a distance of the first lens barrel BR1 relative to the imaging plane may be a fixed value. The structure of each one of the first lens barrel BR1 the second lens barrel BR2 may has a sleeve with openings at opposite ends along the optical axis I The optical imaging lens 1, in an order from the image side A2 to the object side A1, may comprise a first lens element group G1 and a second lens element group G2. The first lens element group G1 may be disposed in the first lens barrel BR1, and a distance of the first lens group G1 relative to an imaging plane may be a fixed value. The second lens element group G2 may be disposed in the second lens barrel BR2. The second lens element group G2, in an order from an object side A1 to an image side A2 along an optical axis, may comprise a first lens element L1, a second lens element L2, and a third lens element L3. The first lens element group G1, in an order from an object side A1 to an image side A2 along an optical axis, may comprise a fourth lens element L4 and a fifth lens element L5. In order to make the first lens element group G1 stably set in the first lens barrel BR1, or make the second lens element group G2 stably set in the second lens barrel BR2, the optical imaging lens module M1 may further comprise a plurality of spacing units SP. The pluralities of spacing units SP may be disposed on the inner side of the first lens barrel BR1 or the second lens barrel BR2 and between any two adjacent lens elements, such that the first lens element L1, the second lens element L2, the third lens element L3, the fourth lens element L4, and the fifth lens element L5 may be disposed spaced apart.

The fixed part YK may be dispose on the substrate SB and surround the first lens barrel BR1. The fixed part YK may extend from the image side A2 to the object side A1 along a direction parallel to the optical axis I, and extend at least to an external side of second lens barrel BR2. In practice, the fixed part YK and the first lens barrel BR1 may be formed integrally as a single part.

The actuating unit AC may be connected to the fixed part YK and the second lens barrel B2 respectively. The actuating unit AC may be a voice coil motor (VCM), a MEMS, or a Piezo motor. The actuating unit AC of the present invention preferentially selects VCM, in which its small size is suitable for mobile phones, and its cost is reduced, such that it realizes the requirements of light, thin and short portable electronic devices, but it is not limited to this.

For example, the actuating unit AC may comprise a carrier part CA, a coil part CL, and a magnetic part MA. The carrier part CA may be disposed on an external side of the second lens barrel BR2 and connected to the second lens barrel BR2. The coil part CL may be wrapped around the external side of the carrier part CA. The magnetic part MA may be disposed on the inner side of the fixed part YK, or partially insert into the inner side of the fixed part YK. The position where the magnetic part MA disposed on the fixed part YK may be corresponding with the position of the coil part CL. A controller (not shown) may control the current of the coil part CL to control the carrier part CA to drive the movement of the second lens barrel BR2. Thereby, the second lens barrel BR2 can move relative to the first lens barrel BR1 along the optical axis I.

In this embodiment, the first lens barrel BR1 and the second lens barrel BR2 may be spaced apart from each other to reduce friction between the lens barrels as shown in FIG.

6A. The first lens barrel BR1 and the second lens barrel BR2 may also partially overlap each other as shown in FIG. 6B.

For example, an end of the first lens barrel BR1 facing toward the object side A1 may have a first limit part RE1, and an end of the second lens barrel BR2 facing toward the image side A2 may have a fourth limit part RE4. The fourth limit part RE4 can move relative to the first limit part RE1 along the optical axis I, i.e., at least one portion of the first lens barrel BR1 may overlap the second lens barrel BR2. In this way, the problem of eccentric assembly can be effectively improved. Further, when the actuating unit AC drives the movement of the second lens barrel BR2, it can reduce the degree of the imaging quality of the optical imaging lens module M1 affected by shaking.

Figure 6C:
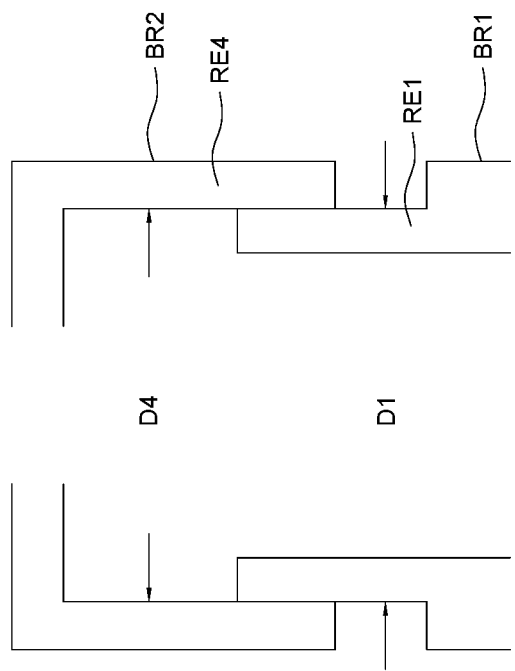
FIG. 6C depicts a partial enlarged structure view of the optical imaging lens module in FIG. 6B.

For example, an outside diameter D1 of the first limit part RE1 may be smaller than an inside diameter D4 of the fourth limit part RE4, such that the second lens barrel BR2 can partially surround the first lens barrel BR1 as shown in FIG. 6C, but it is not limited to this.

Figure 6D:
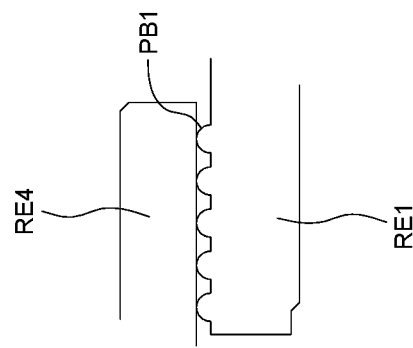
FIG. 6D depicts a partial enlarged structure view of the optical imaging lens module in FIG. 6C.
Figure 6E:
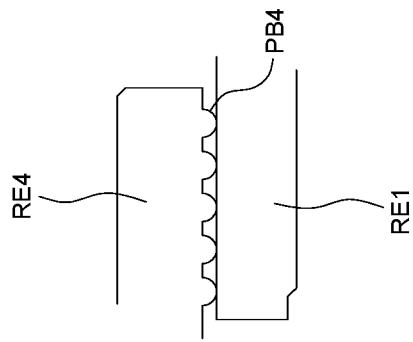
FIG. 6E depicts a partial enlarged structure view of the optical imaging lens module in FIG. 6C.

To reduce the resistance of the movement of the actuating unit AC, an external side of the first limit part RE1 may have a bump unit PB1 as shown in FIG. 6D, or an inner side of the fourth limit part RE4 may have a bump unit PB4 as shown in FIG. 6E. Among them, the design of the bump unit PB1 on the external side of the first limit part RE1 makes it easier to mold and release. It should be noted that, the number of the bump units PB1 is not limited, and at least one of the pluralities of bump units PB1 may be in contact with the inner side of the fourth limit part RE4.

Figure 7A:
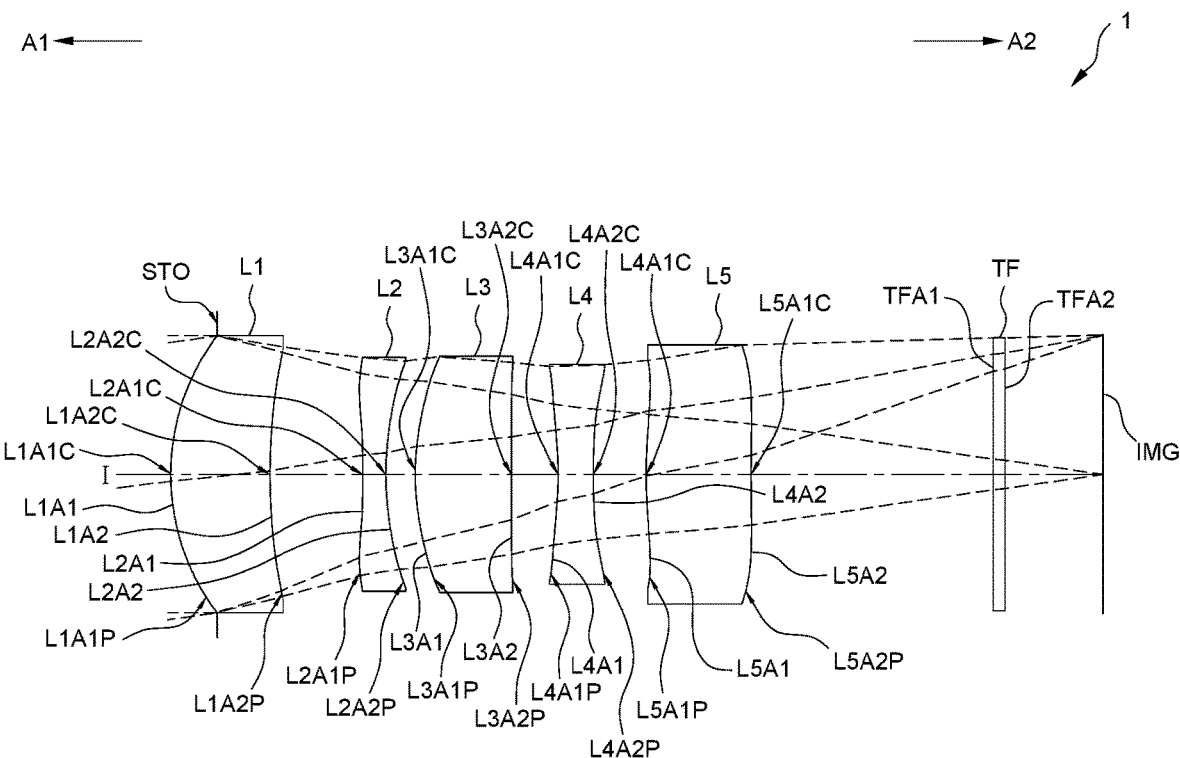
FIG. 7A depicts a cross-sectional view of the optical imaging lens according to the first embodiment of the present disclosure.
Figure 7B:
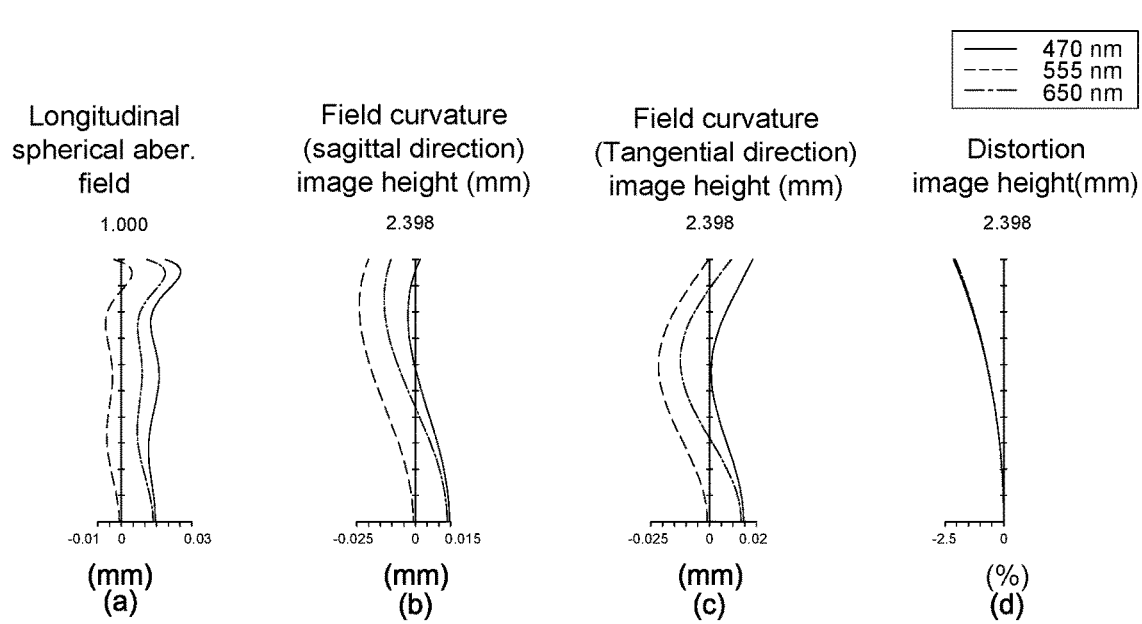
FIG. 7B depicts a chart of a longitudinal spherical aberration and other kinds of optical aberrations of the optical imaging lens according to the first embodiment of the present disclosure.

Reference is now made to FIGS. 7A-7D. FIG. 7A illustrates an example cross-sectional view of an optical imaging lens 1 according to a first example embodiment. FIG. 7B shows example charts of a longitudinal spherical aberration and other kinds of optical aberrations of the optical imaging lens 1 according to the first example embodiment. FIG. 7C illustrates an example table of optical data of each lens element of the optical imaging lens 1 according to the first example embodiment. FIG. 7D depicts an example table of aspherical data of the optical imaging lens 1 according to the first example embodiment.

As shown in FIG. 7A, the optical imaging lens 1 of the present embodiment, in an order from an object side A1 to an image side A2 along an optical axis, may comprise an aperture stop STO, a first lens element L1, a second lens element L2, a third lens element L3, a fourth lens element L4, and a fifth lens element L5. A filtering unit TF and an image plane IMG of an image sensor (SR, shown in FIGS. 6A and 6B) may be positioned at the image side A2 of the optical imaging lens 1.

Each of the first, second, third, fourth, and fifth lens elements L1, L2, L3, L4, L5 and the filtering unit TF may comprise an object-side surface L1A1/L2A1/L3A1/L4A1/L5A1/TFA1 facing toward the object side A1 and an image-side surface L1A2/L2A2/L3A2/L4A2/L5A2/TFA2 facing toward the image side A2. The example embodiment of the illustrated filtering unit TF may be positioned between the fifth lens element L5 and the image plane IMG. The filtering unit TF may be a filter for preventing light with certain wavelength from reaching the mage plane IMG and affecting imaging quality. The first lens element L1, the second lens element L2, and the third lens element L3 may be disposed in the second lens barrel BR2, and the fourth lens element L4 and the fifth lens element L5 may be disposed in the first lens barrel BR1. Since the second lens barrel BR2 used in the optical imaging lens 1 can move relative to the first lens barrel BR1, the distance G34 from the image-side surface L3A2 of the third lens element L3 to the object-side surface L4A1 of the fourth lens element L4 along the optical axis I may be an adjustable distance (an adjustable gap). This change in the adjustable distance corresponds to the distance adjusted when the actuating unit AC focuses.

Exemplary embodiments of each lens element of the optical imaging lens 1 will now be described with reference to the drawings. The lens elements L1, L2, L3, L4, and L5 of the optical imaging lens 1 may be constructed using plastic materials in this embodiment, but it is not limited to this.

An example embodiment of the first lens element L1 may have positive refracting power. Both of the optical axis region L1A1C and the periphery region L1A1P of the object-side surface L1A1 of the first lens element L1 may be convex. Both of the optical axis region L1A2C and the periphery region L1A2P of the image-side surface L1A2 of the first lens element L1 may be concave.

An example embodiment of the second lens element L2 may have negative refracting power. Both of the optical axis region L2A1C and the periphery region L2A1P of the object-side surface L2A1 of the second lens element L2 may be convex. Both of the optical axis region L2A2C and the periphery region L2A2P of the image-side surface L2A2 of the second lens element L2 may be concave.

An example embodiment of the third lens element L3 may have positive refracting power. Both of the optical axis region L3A1C and the periphery region L3A1P of the object-side surface L3A1 of the third lens element L3 may be convex. The optical axis region L3A2C of the image-side surface L3A2 of the third lens element L3 may be convex. The periphery region L3A2P of the image-side surface L3A2 of the third lens element L3 may be concave.

An example embodiment of the fourth lens element L4 may have negative refracting power. Both of the optical axis region L4A1C and the periphery region L4A1P of the object-side surface L4A1 of the fourth lens element L4 may be concave. Both of the optical axis region L4A2C and the periphery region L4A2P of the image-side surface L4A2 of the fourth lens element L4 may be concave.

An example embodiment of the fifth lens element L5 may have positive refracting power. The optical axis region L5A1C of the object-side surface L5A1 of the fifth lens element L5 may be convex. The periphery region L5A1P of the object-side surface L5A1 of the fifth lens element L5 may be concave. The optical axis region L5A2C of the image-side surface L5A2 of the fifth lens element L5 may be concave. The periphery region L5A2P of the image-side surface L5A2 of the fifth lens element L5 may be convex.

Lens elements of the optical imaging lens 1 having refracting power may be composed of the first lens element L1, the second lens element L2, the third lens element L3, the fourth lens element L4, and the fifth lens element L5.

The aspherical surfaces including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, and the object-side surface L5A1 and the image-side surface L5A2 of the fifth lens element L5 may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 7D.

FIG. 7B(a) shows a longitudinal spherical aberration for three representative wavelengths (470 nm, 555 nm and 650 nm), wherein the vertical axis of FIG. 7B (a) defines the field of view. FIG. 7B(b) shows the field curvature aberration in the sagittal direction for three representative wavelengths (470 nm, 555 nm and 650 nm), wherein the vertical axis of FIG. 7B(b) defines the image height. FIG. 7B(c) shows the field curvature aberration in the tangential direction for three representative wavelengths (470 nm, 555 nm and 650 nm), wherein the vertical axis of FIG. 7B(c) defines the image height. FIG. 7B(d) shows a variation of the distortion aberration, wherein the vertical axis of FIG. 7B(d) defines the image height. The three curves with different wavelengths (470 nm, 555 nm and 650 nm) may represent that off-axis light with respect to these wavelengths may be focused around an image point. From the vertical deviation of each curve shown in FIG. 7B(a), the offset of the off-axis light relative to the image point may be within about ±0.03 mm. Therefore, the first embodiment may improve the longitudinal spherical aberration with respect to different wavelengths. Referring to FIG. 7B(b), the focus variation with respect to the three different wavelengths (470 nm, 555 nm and 650 nm) in the whole field may fall within about ±0.025 mm. Referring to FIG. 7B(c), the focus variation with respect to the three different wavelengths (470 nm, 555 nm and 650 nm) in the whole field may fall within about ±0.025 mm. Referring to FIG. 7B(d), and more specifically the horizontal axis of FIG. 7B(d), the variation of the distortion aberration may be within about ±2.5%.

As shown in FIG. 7C, the distance from the object-side surface L1A1 of the first lens element L1 to the image plane IMG along the optical axis (TTL), the system length, may be about 141 mm, F-number (Fno) may be about 3.475, the half field of view (HFOV) may be about 8.387 degrees, the system focal length (EFL) of the optical imaging lens 1 may be about 17.715 mm, the image height of the optical imaging lens 1 may be about 2.557 mm, and f35 equivalent focal length may be 149.990 mm. In accordance with these difference values, the present embodiment may provide an optical imaging lens 1 having a shortened system length of the optical imaging lens and an increased system focal length while improving assembly yield.

Please refer to FIG. 14 for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/(TTL*D), and ALT/AAG of the present embodiment, in which these parameter values are obtained when the optical imaging lens 1 is at 20° C. with infinite object distances.

Regarding the distance adjusted when the actuating unit AC of the optical imaging lens module M1 of this embodiment focuses is now made to FIG. 7E. FIG. 7E illustrates a table of data of the distance between the image-side surface of the third lens element and the object-side surface of the fourth lens element of the optical imaging lens according to the first embodiment of the present disclosure when the object distances are infinity (relatively far distance) and 1200 mm at different temperatures (−20° C., 20° C., and 60° C.). As shown in FIG. 7E, G34 of the optical imaging lens at temperature of 20° C. with the object distances of infinity is 0.857 mm, and at the same temperature with the object distances of 1.200 m is 0.963 mm. In other words, the moving distance of the second lens barrel BR2 (movable barrel) during from the optical imaging lens 1 at 20° C. and focusing at infinite object distance to the optical imaging lens 1 at 20° C. and focusing at an object distance of 1.200 m is 0.106 mm. Further, the moving distance of the second lens barrel BR2 (movable barrel) during from the optical imaging lens 1 at 20° C. and focusing at infinite object distance to the optical imaging lens 1 at 60° C. and focusing at an object distance of 1.200 m, D, is 0.163 mm. Accordingly, the moving distance of the actuating unit AC of the optical imaging lens module M1 focusing at different temperatures is within the travel distance provided by actuators currently on the market. Therefore, the optical imaging lens module M1 with the optical imaging lens 1 can be used at different temperatures for the travel distance provided by the currently available actuation units.

Figure 8B:
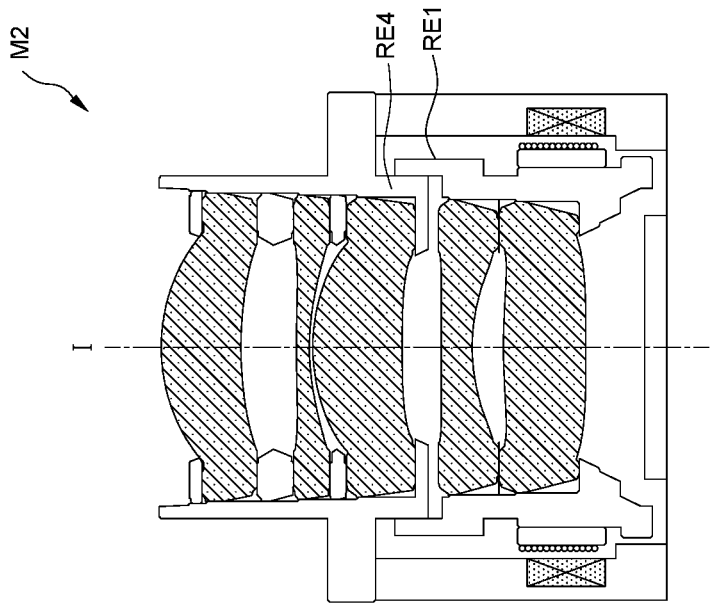
FIG. 8B depicts a cross-sectional view of the optical imaging lens module according to the second embodiment of the present disclosure.
Figure 8A:
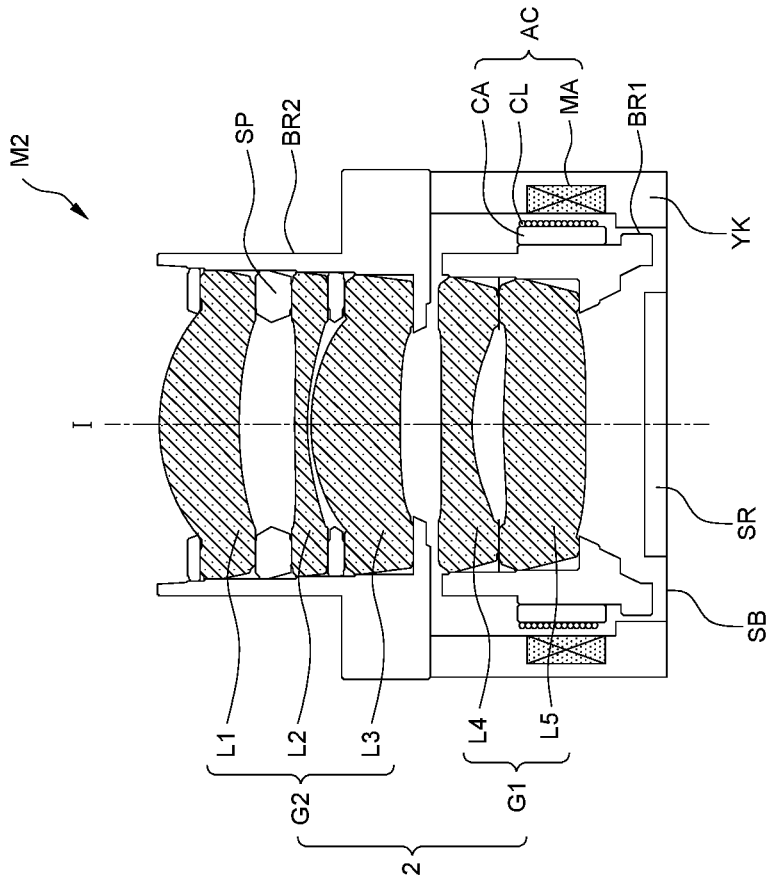
FIG. 8A depicts a cross-sectional view of the optical imaging lens module according to the second embodiment of the present disclosure.

Reference is now made to FIGS. 8A and 8B. Each one of FIGS. 8A and 8B illustrates a cross-sectional view of the optical imaging lens module M2 according to the second embodiment of the present disclosure. The optical imaging lens module M2 may be generally similar to the optical imaging lens module M1, and the optical imaging lens module M2 of the present embodiment may comprise a first lens barrel BR1, a second lens barrel BR2, an optical imaging lens 2 with five lens elements, and an actuating unit AC, in which a fourth lens element L4 and a fifth lens element L5 may be disposed in the first lens barrel BR1, and a first lens element L1, a second lens element L2, and a third lens element L3 may be disposed in the second lens barrel BR2.

The optical imaging lens 2 may have the same optical characteristics as the optical imaging lens 1. Please refer to FIG. 14 for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/ (TTL*D), and ALT/AAG of the present embodiment, in which these parameter values are obtained when the optical imaging lens 2 is at 20° C. with infinite object distances.

The differences between the optical imaging lens module M1 and the optical imaging lens module M2 may include the second lens barrel BR2 of the optical imaging lens module M2 is fixedly connected to the fixing part YK or formed integrally as a single part, and the fixing part YK may be fixedly disposed on the substrate SB. The actuating unit AC is connected to the fixing part YK and the first lens barrel BR1 respectively. More specifically, the carrier part CA may be disposed on an external side of the first lens barrel BR and connected to the first lens barrel BR1. The coil part CL may be wrapped around the external side of the carrier part CA. The magnetic part MA may be disposed on the inner side of the fixed part YK, or partially insert into the inner side of the fixed part YK. The position where the magnetic part MA disposed on the fixed part YK may be corresponding with the position of the coil part CL. A controller (not shown) may control the current of the coil part CL to control the carrier part CA to drive the movement of the first lens barrel BR1. Thereby, the first lens barrel BR1 can move relative to the second lens barrel BR2 along the optical axis I.

Similar to the first embodiment, in this embodiment, the first lens barrel BR1 and the second lens barrel BR2 may be spaced apart from each other to reduce friction between the lens barrels as shown in FIG. 8A. The first lens barrel BR1 and the second lens barrel BR2 may also partially overlap each other as shown in FIG. 8B.

For example, an end of the first lens barrel BR1 facing toward the object side A1 may have a first limit part RE1, and an end of the second lens barrel BR2 facing toward the image side A2 may have a fourth limit part RE4. The first limit part RE1 can move relative to the fourth limit part RE4 along the optical axis I, i.e., at least one portion of the first lens barrel BR1 may overlap the second lens barrel BR2. In this way, the problem of eccentric assembly can be effectively improved. Further, when the actuating unit AC drives the movement of the first lens barrel BR1, it can reduce the degree of the imaging quality of the optical imaging lens module M1 affected by shaking.

Figure 8C:
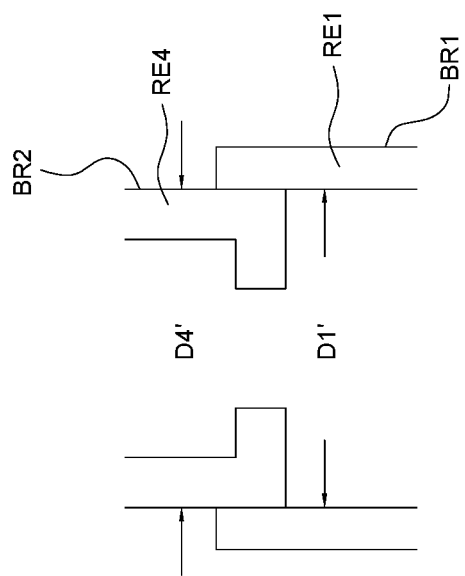
FIG. 8C depicts a partial enlarged structure view of the optical imaging lens module in FIG. 8B.

For example, an inside diameter D1' of the first limit part RE1 may be larger than an outside diameter D4' of the fourth limit part RE4, such that the first lens barrel BR1 can partially surround the second lens barrel BR2 as shown in FIG. 8C, but it is not limited to this.

To reduce the resistance of the movement of the actuating unit AC, an inner side of the first limit part RE1, or an external side of the fourth limit part RE4 may have a bump unit as shown in FIGS. 6D and 6E. Among them, the design of the bump unit on the external side of the fourth limit part RE4 makes it easier to mold and release.

Figure 9B:
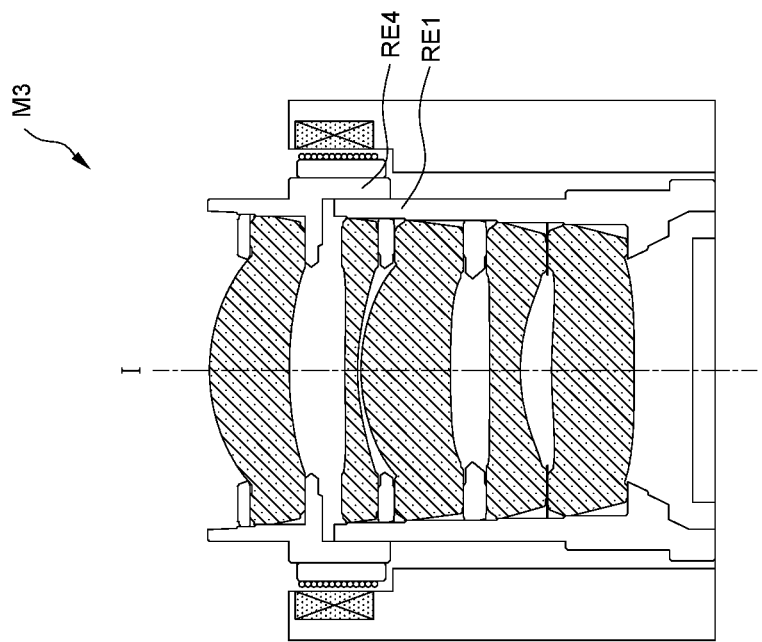
FIG. 9B depicts a cross-sectional view of the optical imaging lens module according to the third embodiment of the present disclosure.
Figure 9A:
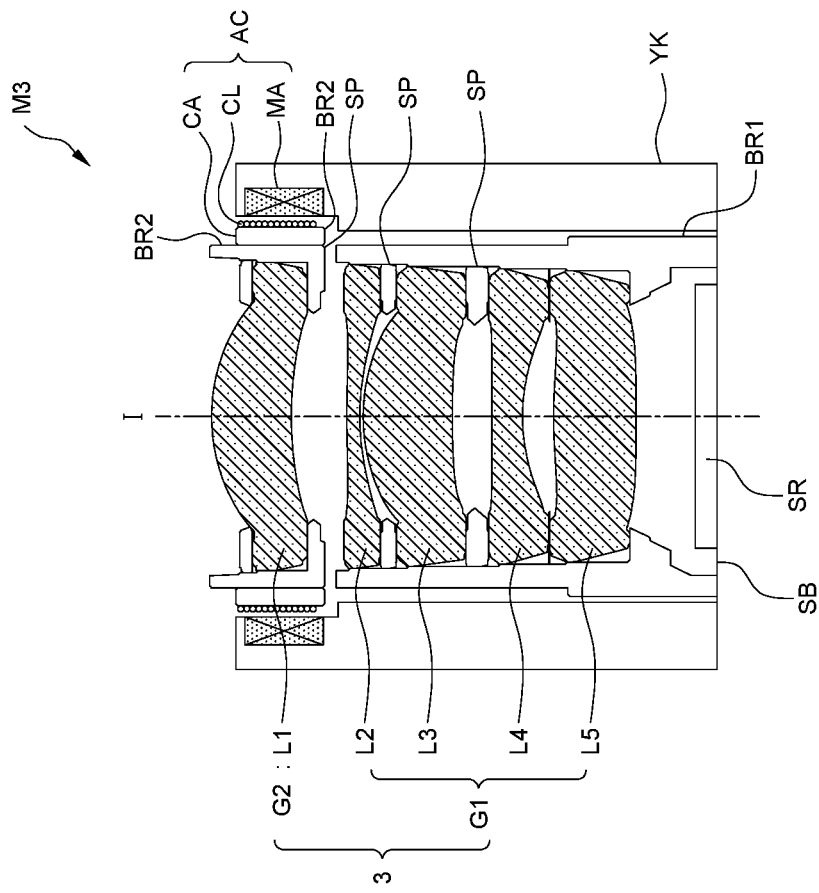
FIG. 9A depicts a cross-sectional view of the optical imaging lens module according to the third embodiment of the present disclosure.

Reference is now made to FIGS. 9A and 9B. Each one of FIGS. 9A and 9B illustrates a cross-sectional view of the optical imaging lens module M3 according to the third embodiment of the present disclosure. The optical imaging lens module M3 may be generally similar to the optical imaging lens module M1, and the optical imaging lens module M3 of the present embodiment may comprise a first lens barrel BR1, a second lens barrel BR2, an optical imaging lens 3 with five lens elements, and an actuating unit AC. The optical imaging lens 3, in an order from the image side A2 to the object side A1, may comprise a first lens element group G1 and a second lens element group G2. The first lens element group G1 may be disposed in the first lens barrel BR1, and a distance of the first lens group G1 relative to an imaging plane may be a fixed value. The second lens element group G2 may be disposed in the second lens barrel BR2. The second lens element group G2 may comprise a first lens element L1. The first lens element group G1, in an order from an object side A1 to an image side A2 along an optical axis, may comprise a second lens element L2, and a third lens element L3, a fourth lens element L4, and a fifth lens element L5. The actuating unit AC is connected to the fixing part YK and the second lens barrel BR2 respectively, such that the second lens barrel BR2 can move relative to the first lens barrel BR1 along the optical axis I. In practice, the fixing part YK and the first lens barrel BR1 may be formed integrally as a single part.

The differences between the optical imaging lens module M1 and the optical imaging lens module M3 may include the second lens element L2, and the third lens element L3, the fourth lens element L4, and the fifth lens element L5 may be disposed in the first lens barrel BR1, and the first lens element L1 may be disposed in the second lens barrel BR2. As the second lens barrel BR2 can slide relative to the first lens barrel BR1 along the optical axis I, the first lens element L1 can move relative to the second lens element L2 along the optical axis I.

For example, the second lens barrel BR2 can partially surround the first lens barrel BR1 as shown in FIG. 9B, but it is not limited to this.

To reduce the resistance of the movement of the actuating unit AC, an external side of the first limit part RE1, or an inner side of the fourth limit part RE4 may have a bump unit as shown in FIGS. 6D and 6E. Among them, the design of the bump unit on the external side of the first limit part RE1 makes it easier to mold and release.

Figure 10A:
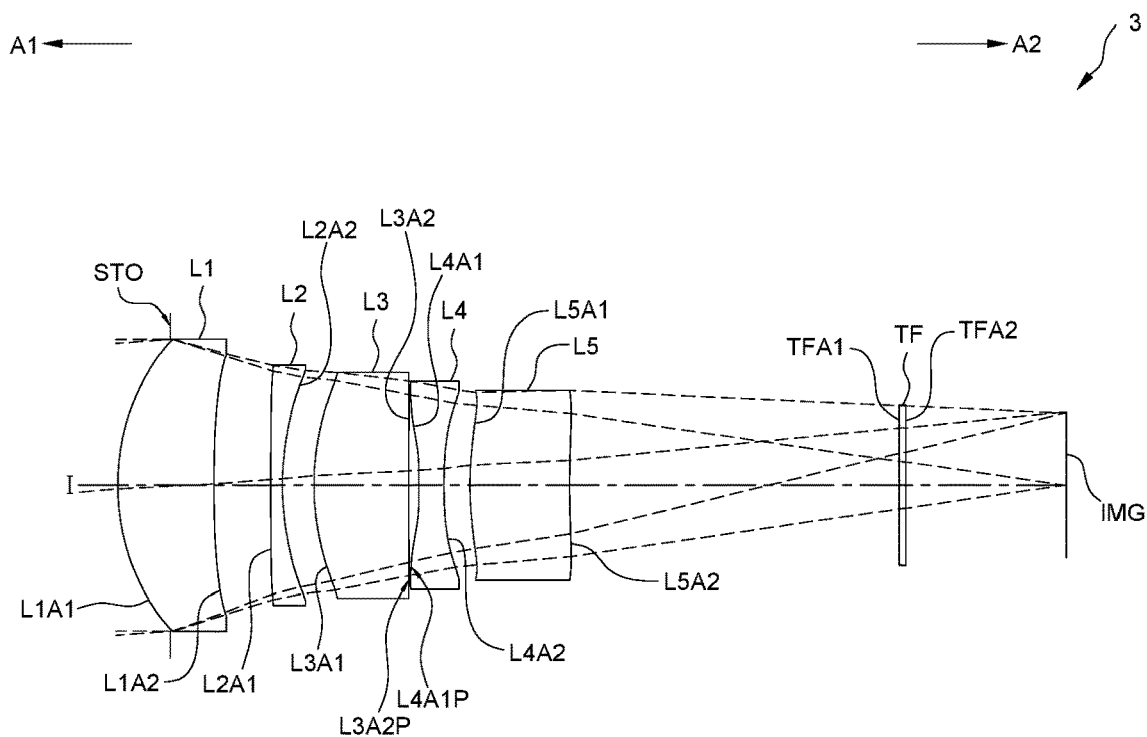
FIG. 10A depicts a cross-sectional view of the optical imaging lens according to the third embodiment of the present disclosure.
Figure 10B:
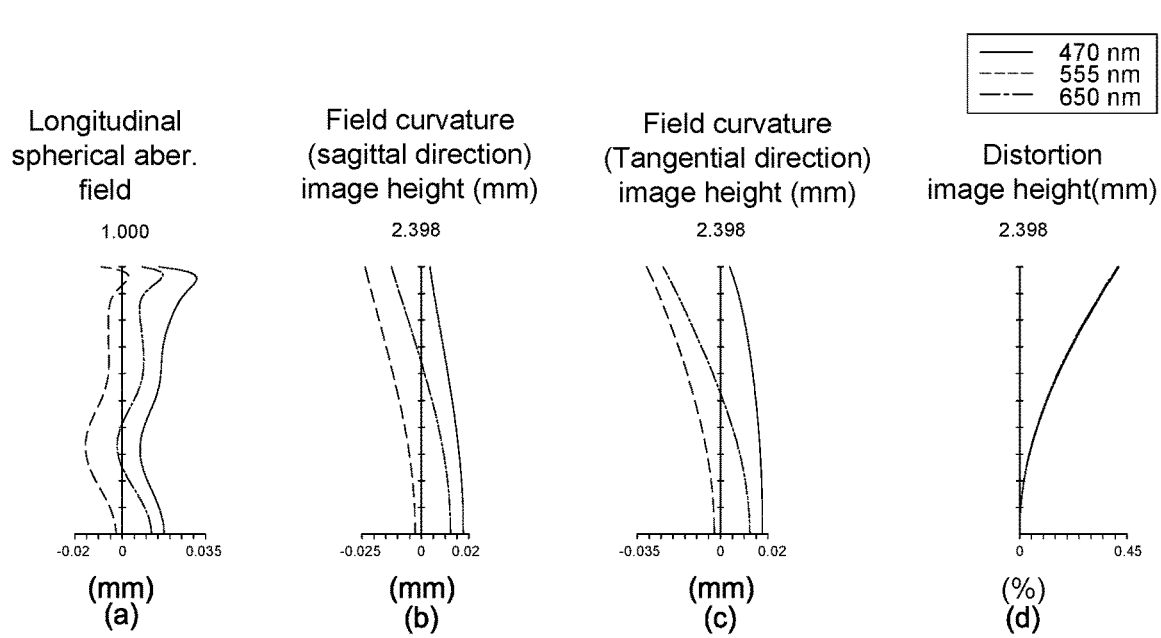
FIG. 10B depicts a chart of a longitudinal spherical aberration and other kinds of optical aberrations of the optical imaging lens according to the third embodiment of the present disclosure.

Reference is now made to FIGS. 10A-10D. FIG. 10A illustrates an example cross-sectional view of an optical imaging lens 3 according to a third example embodiment. FIG. 10B shows example charts of a longitudinal spherical aberration and other kinds of optical aberrations of the optical imaging lens 3 according to the third example embodiment. FIG. 10C illustrates an example table of optical data of each lens element of the optical imaging lens 3 according to the third example embodiment. FIG. 10D depicts an example table of aspherical data of the optical imaging lens 3 according to the third example embodiment.

As shown in FIG. 10A, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4, and a fifth lens element L5. A filtering unit TF and an image plane IMG of an image sensor (SR, shown in FIGS. 9A and 9B) may be positioned at the image side A2 of the optical imaging lens 3.

The arrangement of the convex or concave surface structures, including the object-side surfaces L1A1, L2A1, L3A1, L5A1 and the image-side surfaces L1A2, L2A2, L4A2, L5A2 of the optical imaging lens 3 may be generally similar to the optical imaging lens 1, but the differences between the optical imaging lens 1 and the optical imaging lens 3 may include the concave or concave surface structures of the object-side surface L4A1 and the image-side surface L3A2, a radius of curvature, a thickness, aspherical data, and/or an system focal length of each lens element. More specifically, the periphery region L3A2P of the image-side surface L3A2 of the third lens element L3 of the optical imaging lens 3 may be convex, and the periphery region L4A1P of the object-side surface L4A1 of the fourth lens element L4 of the optical imaging lens 3 may be convex.

Since the second lens barrel BR2 used in the optical imaging lens 3 can move relative to the first lens barrel BR1, the distance G12 from the image-side surface L1A2 of the first lens element L1 to the object-side surface L2A1 of the second lens element L2 along the optical axis I may be an adjustable distance (an adjustable gap). This change in the adjustable distance corresponds to the distance adjusted when the actuating unit AC focuses.

Here, in the interest of clearly showing the drawings of the present embodiment, only the surface shapes which are different from that in the first embodiment may be labeled. Please refer to FIG. 10A for the optical characteristics of each lens element in the optical imaging lens 3 of the present embodiment. For the optical characteristics of each lens element of the optical imaging lens 3 of this embodiment, please refer to FIG. 10C.

From the vertical deviation of each curve shown in FIG. 10B(a), the offset of the off-axis light relative to the image point may be within about ±0.35 mm. Referring to FIG. 10B(b), the focus variation with respect to the three different wavelengths (470 nm, 555 nm and 650 nm) in the whole field may fall within about ±0.025 mm. Referring to FIG. 10B(c), the focus variation with respect to the three different wavelengths (470 nm, 555 nm and 650 nm) in the whole field may fall within about ±0.035 mm. Referring to FIG. 10B(d), the variation of the distortion aberration of the optical imaging lens 3 may be within about ±0.45%.

In comparison with the first embodiment, the field curvature aberration in the sagittal direction and the distortion aberration of the optical imaging lens 3 may be smaller as shown in FIG. 10C and FIG. 10D.

The optical imaging lens 3 may have the same optical characteristics as the optical imaging lens 1. Please refer to FIG. 14 for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/(TTL*D), and ALT/AAG of the present embodiment, in which these parameter values are obtained when the optical imaging lens 3 is at 20° C. with infinite object distances.

Regarding the distance adjusted when the actuating unit AC of the optical imaging lens module M3 of this embodiment focuses is now made to FIG. 10E. FIG. 10E illustrates a table of data of the distance G12 from the image-side surface L1A2 of the first lens element L1 to the object-side surface L2A1 of the second lens element L2 of the optical imaging lens 3 according to the third embodiment of the present disclosure when the object distances are infinity (relatively far distance) and 1200 mm at different temperatures (−20° C., 20° C., and 60° C.). As shown in FIG. 10E, G12 of the optical imaging lens 3 at temperature of 20° C. with the object distances of infinity is 1.751 mm, and at the same temperature with the object distances of 1.200 mm is 1.941 mm. In other words, the moving distance of the second lens barrel BR2 (movable barrel) during from the optical imaging lens 3 at 20° C. and focusing at infinite object distance to the optical imaging lens 3 at 20° C. and focusing at an object distance of 1.200 m is 0.190 mm. Further, the moving distance of the second lens barrel BR2 (movable barrel) during from the optical imaging lens 3 at 20° C. and focusing at infinite object distance to the optical imaging lens 3 at 60° C. and focusing at an object distance of 1.200 m, D, is 0.256 mm. Accordingly, the moving distance of the actuating unit AC of the optical imaging lens module M3 focusing at different temperatures is within the travel distance provided by actuators currently on the market. Therefore, the optical imaging lens module M3 with the optical imaging lens 3 can be used at different temperatures for the travel distance provided by the currently available actuation units.

Figure 11A:
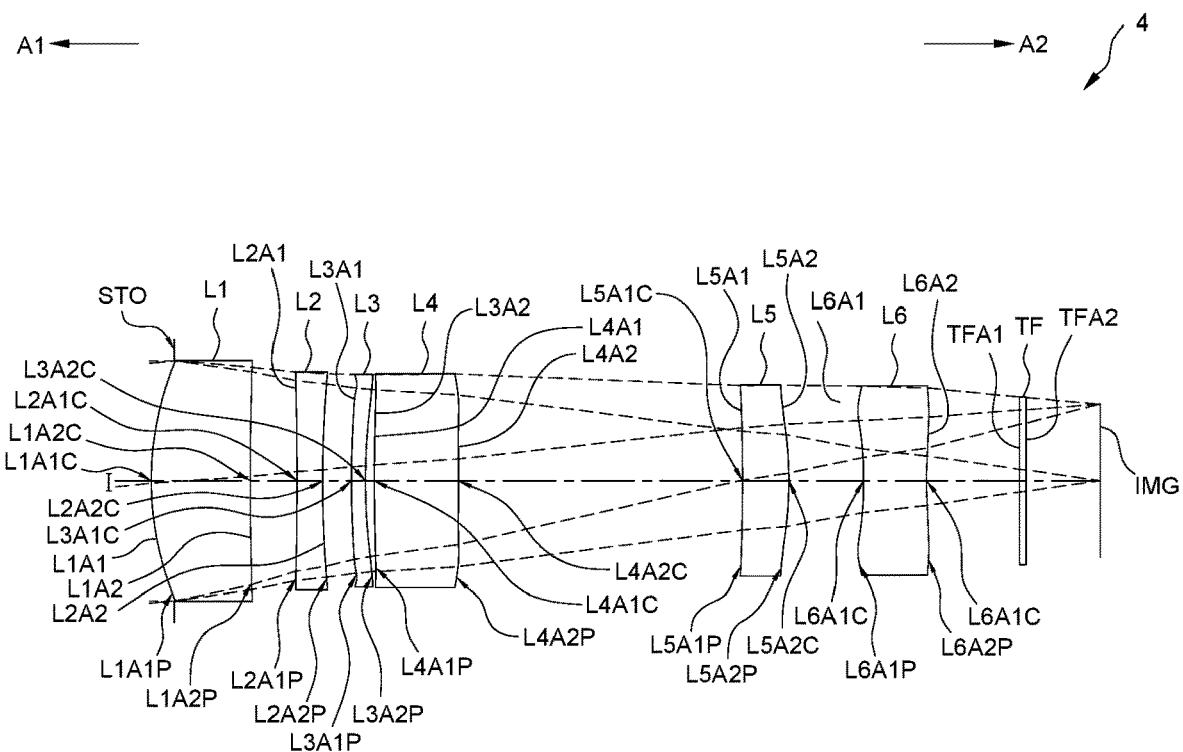
FIG. 11A depicts a cross-sectional view of the optical imaging lens according to the fourth embodiment of the present disclosure.
Figure 11B:
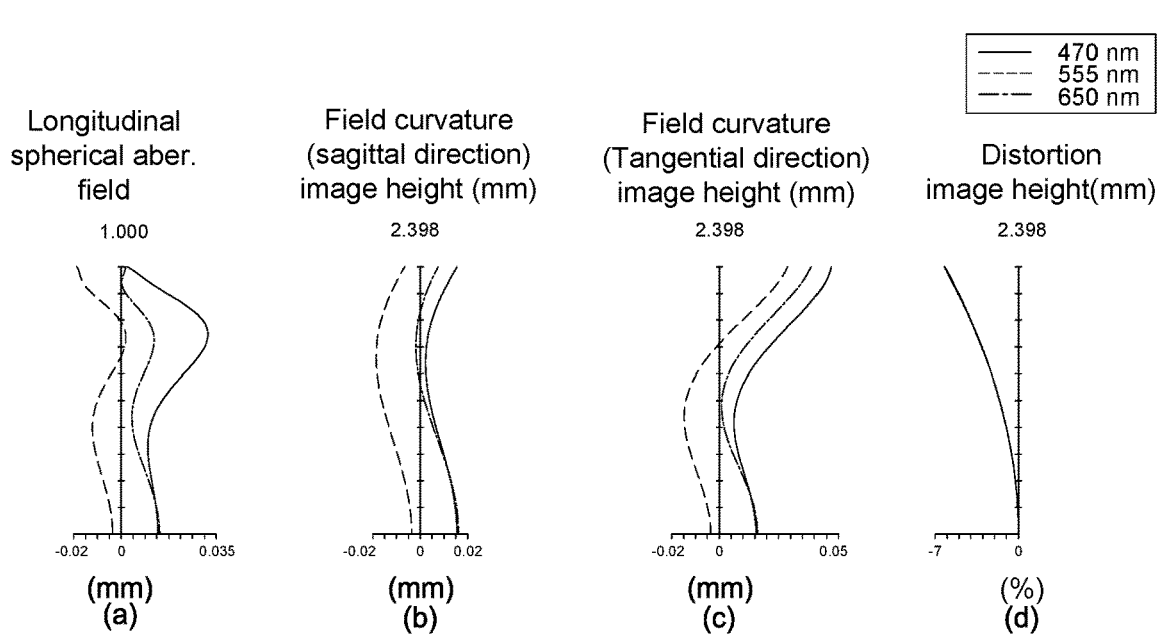
FIG. 11B depicts a chart of a longitudinal spherical aberration and other kinds of optical aberrations of the optical imaging lens according to the fourth embodiment of the present disclosure.

Reference is now made to FIGS. 11A-11D. FIG. 11A illustrates an example cross-sectional view of an optical imaging lens 4 according to a fourth example embodiment. FIG. 11B shows example charts of a longitudinal spherical aberration and other kinds of optical aberrations of the optical imaging lens 4 according to the fourth example embodiment. FIG. 11C shows an example table of optical data of each lens element of the optical imaging lens 4 according to the fourth example embodiment. FIG. 11D shows an example table of aspherical data of the optical imaging lens 4 according to the fourth example embodiment.

In comparison with the third embodiment, the optical imaging lens 4 of the present embodiment further comprises a sixth lens element L6, which is disposed between the fifth lens element L5 and the filtering unit TF As shown in FIG. 11A. The sixth lens element L6 may comprise an object-side surface L6A1 facing toward the object side A1 and an image-side surface L6A2 facing toward the image side A2. The lens elements L6 may be constructed using plastic materials in this embodiment, but it is not limited to this.

In the fourth embodiment, the first lens element L1 may have positive refracting power. Both of the optical axis region L1A1C and the periphery region L1A1P of the object-side surface L1A1 of the first lens element L1 may be convex. Both of the optical axis region L1A2C and the periphery region L1A2P of the image-side surface L1A2 of the first lens element L1 may be concave.

In the fourth embodiment, the second lens element L2 may have negative refracting power. Both of the optical axis region L2A1C and the periphery region L2A1P of the object-side surface L2A1 of the second lens element L2 may be concave. Both of the optical axis region L2A2C and the periphery region L2A2P of the image-side surface L2A2 of the second lens element L2 may be concave.

In the fourth embodiment, the third lens element L3 may have negative refracting power. The optical axis region L3A1C of the object-side surface L3A1 of the third lens element L3 may be convex. The periphery region L3A1P of the object-side surface L3A1 of the third lens element L3 may be concave. Both of the optical axis region L3A2C and the periphery region L3A2P of the image-side surface L3A2 of the third lens element L3 may be concave.

In the fourth embodiment, the fourth lens element L4 may have positive refracting power. The optical axis region L4A1C of the object-side surface L4A1 of the fourth lens element L4 may be convex. The periphery region L4A1P of the object-side surface L4A1 of the fourth lens element L4 may be concave. Both of the optical axis region L4A2C and the periphery region L4A2P of the image-side surface L4A2 of the fourth lens element L4 may be convex.

In the fourth embodiment, the fifth lens element L5 may have positive refracting power. Both of the optical axis region L5A1C and the periphery region L5A1P of the object-side surface L5A1 of the fifth lens element L5 may be concave. Both of the optical axis region L5A2C and the periphery region L5A2P of the image-side surface L5A2 of the fifth lens element L5 may be convex.

In the fourth embodiment, the sixth lens element L6 may have negative refracting power. The optical axis region L6A1C of the object-side surface L6A1 of the sixth lens element L6 may be concave. The periphery region L6A1P of the object-side surface L6A1 of the sixth lens element L6 may be convex. The optical axis region L6A2C of the image-side surface L6A2 of the sixth lens element L6 may be concave. The periphery region L6A2P of the image-side surface L6A2 of the sixth lens element L6 may be convex Lens elements of the optical imaging lens 4 having refracting power may be composed of the first lens element L1, the second lens element L2, the third lens element L3, the fourth lens element L4, the fifth lens element L5, and the sixth lent element L6. The object-side surface L6A1 and the image-side surface L6A2 of the sixth lens element L6 may be defined by the abovementioned aspherical formula.

In the present embodiment, the first lens element L1 may be disposed in the second lens barrel BR2, and the second lens element L2, the third lens element L3, the fourth lens element L4, the fifth lens element L5, and the sixth lens element L6 may be disposed in the first lens barrel BR1. As the second lens barrel BR2 with the optical imaging lens 4 can slide relative to the first lens barrel BR1 along the optical axis I, the first lens element L1 can move relative to the second lens element L2 along the optical axis I, such that the distance G12 from the image-side surface L1A2 of the first lens element L1 to the object-side surface L2A1 of the second lens element L2 along the optical axis I may be an adjustable distance (an adjustable gap). This change in the adjustable distance corresponds to the distance adjusted when the actuating unit AC focuses.

From the vertical deviation of each curve shown in FIG. 11B(a), the offset of the off-axis light relative to the image point may be within about ±0.35 mm. Referring to FIG. 11B(b), the focus variation with respect to the three different wavelengths (470 nm, 555 nm and 650 nm) in the whole field may fall within about ±0.02 mm. Referring to FIG. 11B(c), the focus variation with respect to the three different wavelengths (470 nm, 555 nm and 650 nm) in the whole field may fall within about ±0.025 mm. Referring to FIG. 11B(d), the variation of the distortion aberration of the optical imaging lens 4 may be within about ±7%.

In comparison with the third embodiment, the field curvature aberration in the sagittal direction and the tangential direction of the optical imaging lens 4 may be smaller, and the half field of view and the image height of the optical imaging lens 4 may be larger as shown in FIG. 11C and FIG. 11D.

Please refer to FIG. 15 for the values of f35 effective focal length, T1, G12, T2, G23, T3, G34, T4, G45, T5, G56, T6, G6F, TTF, GFP, BFL, EFL, TTL, TL, ALT, AAG, D, HFOV, EFL/TTL, EFL/(TTL*D), and ALT/AAG of the present embodiment, in which these parameter values are obtained when the optical imaging lens 5 is at 20° C. with infinite object distances.

Regarding the distance adjusted when the actuating unit AC of the optical imaging lens module (not shown) with the optical imaging lens 4 of this embodiment focuses is now made to FIG. 11E. FIG. 11E illustrates a table of data of the distance G12 between the image-side surface L1A2 of the first lens element L1 and the object-side surface L2A1 of the second lens element L2 of the optical imaging lens 4 according to the third embodiment of the present disclosure when the object distances are infinity (relatively far distance) and 1200 mm at different temperatures (−20° C., 20° C., and 60° C.). As shown in FIG. 11E, G12 of the optical imaging lens 4 at temperature of 20° C. with the object distances of infinity is 1.509 mm, and at the same temperature with the object distances of 1.200 m is 1.831 mm. In other words, the moving distance of the second lens barrel BR2 (movable barrel) during from the optical imaging lens 4 at 20° C. and focusing at infinite object distance to the optical imaging lens 4 at 20° C. and focusing at an object distance of 1.200 m is 0.322 mm. Further, the moving distance of the second lens barrel BR2 (movable barrel) during from the optical imaging lens 4 at 20° C. and focusing at infinite object distance to the optical imaging lens 4 at 60° C. and focusing at an object distance of 1.200 m, D, is 0.437 mm. Accordingly, the moving distance of the actuating unit AC of the optical imaging lens module M4 focusing at different temperatures is within the travel distance provided by actuators currently on the market. Therefore, the optical imaging lens module M4 with the optical imaging lens 4 can be used at different temperatures for the travel distance provided by the currently available actuation units.

Figure 12B:
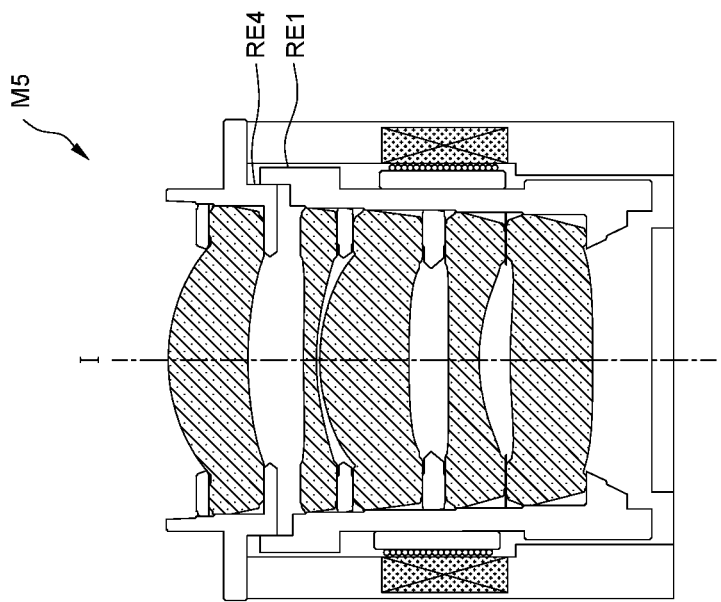
FIG. 12B depicts a cross-sectional view of the optical imaging lens module according to the fifth embodiment of the present disclosure.
Figure 12A:
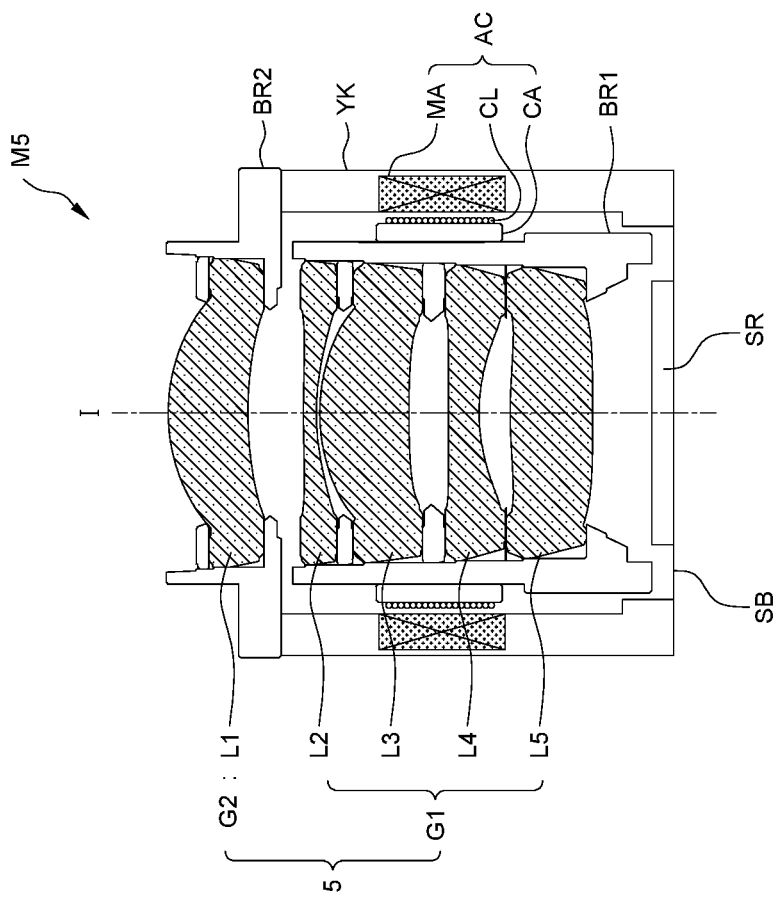
FIG. 12A depicts a cross-sectional view of the optical imaging lens module according to the fifth embodiment of the present disclosure.

Reference is now made to FIGS. 12A and 12B. Each one of FIGS. 12A and 12B illustrates a cross-sectional view of the optical imaging lens module M5 according to the fifth embodiment of the present disclosure. The optical imaging lens module M5 may be generally similar to the optical imaging lens module M3, and the optical imaging lens module M5 of the present embodiment may comprise a first lens barrel BR1, a second lens barrel BR2, an optical imaging lens 5 with five lens elements, and an actuating unit AC, in which the second lens element L2, and the third lens element L3, the fourth lens element L4, and the fifth lens element L5 may be disposed in the first lens barrel BR1, and the first lens element L1 may be disposed in the second lens barrel BR2. The optical imaging lens 5 may have the same optical characteristics as the optical imaging lens 3. Please refer to FIG. 14 for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/(TTL*D), and ALT/AAG of the present embodiment, in which these parameter values are obtained when the optical imaging lens 5 is at 20° C. with infinite object distances.

The differences between the optical imaging lens module M3 and the optical imaging lens module M5 may include the second lens barrel BR2 of the optical imaging lens module M5 is fixedly connected to the fixing part YK or formed integrally as a single part, and the fixing part YK may be fixedly disposed on the substrate SB. The actuating unit AC is connected to the fixing part YK and the first lens barrel BR1 respectively. More specifically, the carrier part CA may be disposed on an external side of the first lens barrel BR1 and connected to the first lens barrel BR1. The coil part CL may be wrapped around the external side of the carrier part CA. The magnetic part MA may be disposed on the inner side of the fixed part YK, or partially insert into the inner side of the fixed part YK. The position where the magnetic part MA disposed on the fixed part YK may be corresponding with the position of the coil part CL. A controller (not shown) may control the current of the coil part CL to control the carrier part CA to drive the movement of the first lens barrel BR1. Thereby, the first lens barrel BR1 can move relative to the second lens barrel BR2 along the optical axis I.

Similar to the third embodiment, in this embodiment, the first lens barrel BR1 and the second lens barrel BR2 may be spaced apart from each other to reduce friction between the lens barrels as shown in FIG. 12A. The first lens barrel BR1 and the second lens barrel BR2 may also partially overlap each other as shown in FIG. 12B.

For example, an end of the first lens barrel BR1 facing toward the object side A1 may have a first limit part RE1, and an end of the second lens barrel BR2 facing toward the image side A2 may have a fourth limit part RE4. The first limit part RE1 can move relative to the fourth limit part RE4 along the optical axis I, i.e., at least one portion of the first lens barrel BR1 may overlap the second lens barrel BR2. In this way, the problem of eccentric assembly can be effectively improved. Further, when the actuating unit AC drives the movement of the first lens barrel BR1, it can reduce the degree of the imaging quality of the optical imaging lens module M5 affected by shaking.

For example, the first lens barrel BR1 can partially surround the second lens barrel BR2 as shown in FIG. 12B, but it is not limited to this.

To reduce the resistance of the movement of the actuating unit AC, an inner side of the first limit part RE1, or an external side of the fourth limit part RE4 may have a bump unit as shown in FIGS. 6D and 6E. Among them, the design of the bump unit on the external side of the fourth limit part RE4 makes it easier to mold and release.

Figure 13B:
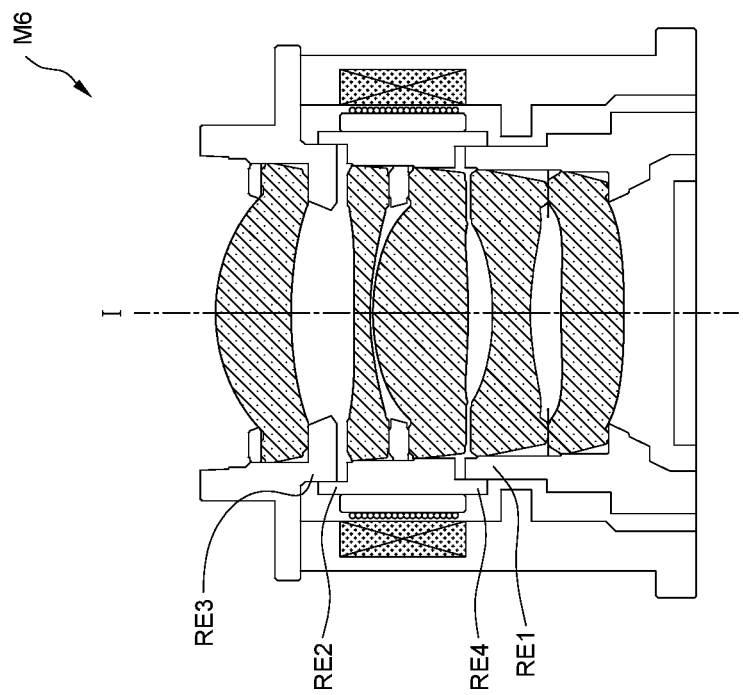
FIG. 13B depicts a cross-sectional view of the optical imaging lens module according to the sixth embodiment of the present disclosure.
Figure 13A:
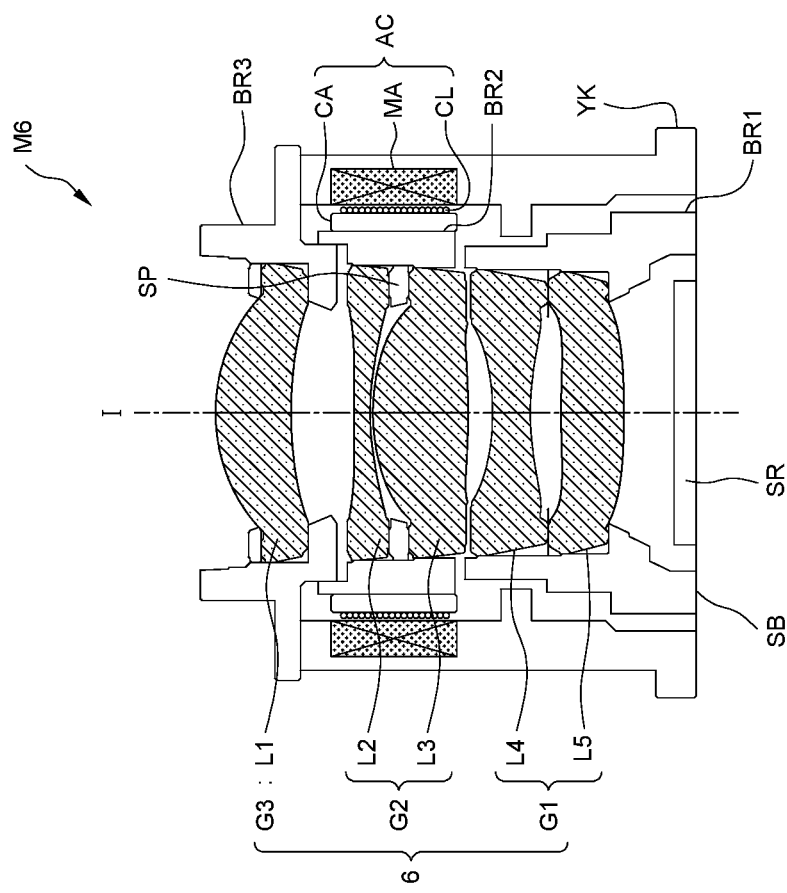
FIG. 13A depicts a cross-sectional view of the optical imaging lens module according to the sixth embodiment of the present disclosure.

Reference is now made to FIGS. 13A and 13B. Each one of FIGS. 13A and 13B illustrates a cross-sectional view of the optical imaging lens module M6 according to the sixth embodiment of the present disclosure. The optical imaging lens module M6 may be generally similar to the optical imaging lens module M1, and the optical imaging lens module M6 of the present embodiment may comprise a first lens barrel BR1, a second lens barrel BR2, an optical imaging lens 6 with five lens elements, and an actuating unit AC. The actuating unit AC is connected to the fixing part YK and the second lens barrel BR2 respectively, such that the movement of the second lens barrel BR2 can be controlled by the actuating unit AC.

The differences between the optical imaging lens module M1 and the optical imaging lens module M6 may include the optical imaging lens module M6 further comprises a third lens barrel BR3 disposed between the second lens barrel BR2 and the object side A1 and fixedly connected to the fixing part YK or formed integrally as a single part. The third lens barrel BR3 may be a sleeve having openings at opposite ends along the optical axis I. The first lens barrel BR1 and the third lens barrel BR3 fixedly connected to the fixing part YK or formed integrally as a single part. More specifically, the carrier part CA may be disposed on an external side of the second lens barrel BR2 and connected to the second lens barrel BR2. The coil part CL may be wrapped around the external side of the carrier part CA. The magnetic part MA may be disposed on the inner side of the fixed part YK, or partially insert into the inner side of the fixed part YK. The position where the magnetic part MA disposed on the fixed part YK may be corresponding with the position of the coil part CL. A controller (not shown) may control the current of the coil part CL to control the carrier part CA to drive the movement of the second lens barrel BR2. Thereby, the second lens barrel BR2 can move relative to the first lens barrel BR1 and the third lens barrel BR3 along the optical axis I.

The optical imaging lens 6, in an order from the image side A2 to the object side A1, may comprise a first lens element group G1, a second lens element group G2, and a third lens element group G3. The first lens element group G1 may be disposed in the first lens barrel BR1, and a distance of the first lens element group G1 relative to an imaging plane may be a fixed value. The second lens element group G2 may be disposed in the second lens barrel BR2. The third lens element group G3 may be disposed in the third lens barrel BR3, and a distance of the third lens element group G3 relative to an imaging plane may be a fixed value. The third lens element group G3 may comprise a first lens element L1. The second lens element group G2, in an order from an object side A1 to an image side A2 along an optical axis, may comprise a second lens element L2 and a third lens element L3. The first lens element group G1, in an order from an object side A1 to an image side A2 along an optical axis, may comprise a fourth lens element L4 and a fifth lens element L5.

Since the second lens barrel BR2 used in the optical imaging lens 6 can move relative to the first lens barrel BR1 and the third lens barrel BR3, the distance G12 from the image-side surface L1A2 of the first lens element L1 to the object-side surface L2A1 of the second lens element L2 along the optical axis I may be an adjustable distance (an adjustable gap). The distance G34 from the image-side surface L3A2 of the third lens element L3 to the object-side surface L4A1 of the fourth lens element L4 along the optical axis I may also be an adjustable distance. This change in the adjustable distances corresponds to the distance adjusted when the actuating unit AC focuses.

In this embodiment, the first lens barrel BR1 and the second lens barrel BR2 may be spaced apart from each other to reduce friction between the lens barrels, and second lens barrel BR2 and the third lens barrel BR3 may partially overlap each other as shown in FIG. 13A. The first lens barrel BR1 and the second lens barrel BR2 may also partially overlap each other, and second lens barrel BR2 and the third lens barrel BR3 may partially overlap each other as shown in FIG. 13B.

Similar to the first embodiment, an end of the first lens barrel BR1 facing toward the object side A1 may have a first limit part RE1, and an end of the second lens barrel BR2 facing toward the image side A2 may have a fourth limit part RE4. The fourth limit part RE4 can move relative to the first limit part RE1 along the optical axis I, i.e., at least one portion of the first lens barrel BR1 may overlap the second lens barrel BR2 as shown in FIGS. 13A and 13B. Besides, an end of the second lens barrel BR2 facing toward the object side A1 may have a second limit part RE2, and an end of the third lens barrel BR3 facing toward the image side A2 may have a third limit part RE3. The second limit part RE2 can move relative to the third limit part RE3 along the optical axis I, i.e., at least one portion of the second lens barrel BR2 may overlap the third lens barrel BR3 as shown in FIG. 13B In this way, the problem of eccentric assembly can be effectively improved. Further, when the actuating unit AC drives the movement of the second lens barrel BR2, it can reduce the degree of the imaging quality of the optical imaging lens module M6 affected by shaking.

Figure 13C:
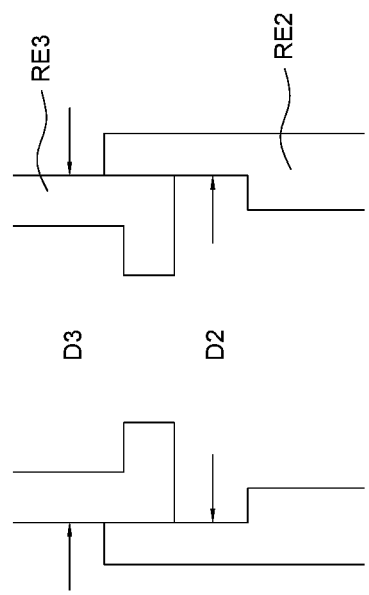
FIG. 13C depicts a partial enlarged structure view of the optical imaging lens module in FIG. 13B

For example, an inside diameter D2 of the second limit part RE2 may be larger than an outside diameter D3 of the third limit part RE3, such that the second lens barrel BR2 can partially surround the third lens barrel BR3 as shown in FIG. 13C, but it is not limited to this.

To reduce the resistance of the movement of the actuating unit AC, an inner side of the second limit part RE2, or an external side of the third limit part RE3 may have a bump unit as shown in FIGS. 6D and 6E. Among them, the design of the bump unit on the external side of the third limit part RE3 makes it easier to mold and release.

The optical imaging lens 6 may have the same optical characteristics as the optical imaging lens 1. Please refer to FIG. 14 for the values of f35 equivalent focal length, T1, G12, T2, G23, T3, G34, T4, G45, T5, G5F, TTF, GFP, BFL, EFL, TTL, TL, ALT, AAG, D, HFOV, EFL/TTL, EFL/(TTL*D), and ALT/AAG of the present embodiment, in which these parameter values are obtained when the optical imaging lens 6 is at 20° C. with infinite object distances.

FIGS. 14 and 14 show the values of optical parameters of all embodiments, and it may be clear that the optical imaging lens 1-6 of any one of the abovementioned embodiments may satisfy any one of the Inequalities (1)-(4). The optical imaging lens modules M1-M3, M5, and M6 can be used at different temperatures for the travel distance provided by the currently available actuation units.

According to above disclosure, the longitudinal spherical aberration, the field curvature aberration and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the 470 nm, 555 nm and 650 nm wavelengths may indicate that focusing ability and inhibiting ability for dispersion may be provided for different wavelengths.

In consideration of the non-predictability of design for the optical system, while the optical imaging lens may satisfy any one of inequalities described above, the optical imaging lens according to the disclosure herein may achieve a shortened length of the lens, reduced spherical aberration, field curvature aberration, and distortion aberration of the optical system, and an increased field of view of the optical imaging system, improve an imaging quality or assembly yield, and effectively improve drawbacks of a typical optical imaging lens.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens module comprising:
   a first lens barrel and a second lens barrel, positioned in an order from an image side to an object side along an optical axis;
   an optical imaging lens, comprising a first lens element group and a second lens element group, disposed in the first lens barrel and the second lens barrel respectively, wherein each of lens elements of the first lens element group and the second lens element group has an object-side surface facing toward the object side and allowing imaging rays to pass through as well as an image-side surface facing toward the image side and allowing the imaging rays to pass through; and
   an actuating unit, disposed on an external side of the second lens barrel to make the second lens barrel to be a movable barrel, wherein the movable barrel can move along the optical axis relative to the first lens barrel;
   wherein a system focal length is represented by EFL, a distance from an object side of the lens element closest to the object side to an imaging plane along the optical axis is represented by TTL, a moving distance of the movable barrel adjusted during from the optical imaging lens at 20 degrees Celsius and focusing at an infinite object distance to the optical imaging lens at 60 degrees Celsius and focusing at an object distance of 1.200 m is represented by D, and the optical imaging lens satisfies inequalities: EFL/TTL≥0.850, and 2.000 (1/mm)≤EFL/(TTL*D)≤10.000 (1/mm).

2. The optical imaging lens module according to claim 1, wherein an end of the first lens barrel facing toward the object side has a first limit part, an end of the second lens barrel facing toward the image side has a fourth limit part, and the fourth limit part can slide along the optical axis relative to the first limit part.

3. The optical imaging lens module according to claim 2, wherein an outside diameter of the first limit part is smaller than an inside diameter of the fourth limit part.

4. The optical imaging lens module according to claim 3, wherein an external side of the first limit part has a bump unit.

5. The optical imaging lens module according to claim 3, wherein an inner side of the fourth limit part has a bump unit.

6. The optical imaging lens module according to claim 1, wherein a distance of the first lens barrel relative to the imaging plane is a fixed value.

7. The optical imaging lens module according to claim 1, wherein a distance of the first lens element group relative to the imaging plane is a fixed value.

8. The optical imaging lens module according to claim 1, wherein the actuating unit is a voice coil motor.

9. The optical imaging lens module according to claim 1, wherein the second lens element group is composed of three lens elements.

10. The optical imaging lens module according to claim 1, wherein the second lens element group is composed of one lens element.

11. The optical imaging lens module according to claim 1, wherein a sum of the thicknesses of the lens elements having refracting power along the optical axis is represented by ALT, a sum of all air gaps between any two adjacent lens elements having refracting power along the optical axis is represented by AGG, and the optical imaging lens further satisfies an inequality: ALT/AAG≤2.700.

12. An optical imaging lens module comprising:
    a first lens barrel and a second lens barrel, positioned in an order from an image side to an object side along an optical axis;
    an optical imaging lens, comprising a first lens element group and a second lens element group, disposed in the first lens barrel and the second lens barrel respectively, wherein each of lens elements of the first lens element group and the second lens element group has an object-side surface facing toward the object side and allowing imaging rays to pass through as well as an image-side surface facing toward the image side and allowing the imaging rays to pass through; and
    an actuating unit, disposed on an external side of the first lens barrel to make the first lens barrel to be a movable barrel, wherein the movable barrel can move along the optical axis relative to the second lens barrel;
    wherein a system focal length is represented by EFL, a distance from an object side of the lens element closest to the object side to an imaging plane along the optical axis is represented by TTL, a moving distance of the movable barrel adjusted during from the optical imaging lens at 20 degrees Celsius and focusing at an infinite object distance to the optical imaging lens at 60 degrees Celsius and focusing at an object distance of 1.200 m is represented by D, and the optical imaging lens satisfies inequalities: EFL/TTL≥0.850, and 2.000 (1/mm)≤EFL/(TTL*D)≤10.000 (1/mm).

13. The optical imaging lens module according to claim 12, wherein a half field of view of the optical imaging lens is represented by HFOV, and the optical imaging lens further satisfies an inequality: HFOV≤9.000°.

14. An optical imaging lens module comprising:
a first lens barrel, a second lens barrel, and a third lens barrel, positioned in an order from an image side to an object side along an optical axis;
an optical imaging lens, comprising a first lens element group, a second lens element group, and a third lens element group disposed in the first lens barrel, the second lens barrel, and the third lens barrel respectively, wherein each of lens elements of the first lens element group, the second lens element group, and the third lens element group has an object-side surface facing toward the object side and allowing imaging rays to pass through as well as an image-side surface facing toward the image side and allowing the imaging rays to pass through; and
an actuating unit, disposed on an external side of the second lens barrel to make the second lens barrel to be a movable barrel, wherein the movable barrel can move along the optical axis relative to the first lens barrel and the third lens barrel;
wherein an end of the second lens barrel facing toward the object side has a second limit part, an end of the third lens barrel facing toward the image side has a third limit part, and the second limit part can slide along the optical axis relative to the third limit part, a distance of the third lens barrel relative to the imaging plane is a fixed value, and the third lens barrel is a fixed barrel.

15. The optical imaging lens module according to claim 14, wherein an external side of the third limit part has a bump unit.

16. The optical imaging lens module according to claim 14, wherein a distance of the third lens element group relative to the imaging plane is a fixed value.

17. The optical imaging lens module according to claim 14, wherein an inside diameter of the second lens barrel is larger than an outside diameter of the third lens barrel.

* * * * *